(12) United States Patent
Beheydt et al.

(10) Patent No.: US 8,409,652 B2
(45) Date of Patent: Apr. 2, 2013

(54) METHOD TO INCREASE THE ANTIOXIDANT ACTIVITY OF CHOCOLATE

(75) Inventors: Bram Beheydt, Schaarbeek (BE); Caroline Ouwerx, Silly (BE); Sonia Collin, Saurlee (BE); Catherine Deledicque, Brussels (BE); Fanny Nguyen, Brussels (BE)

(73) Assignee: Puratos Naamloze Vennootschap, Groot-Bijgaarden (BE)

( * ) Notice: Subject to any disclaimer, the term of this patent is extended or adjusted under 35 U.S.C. 154(b) by 437 days.

(21) Appl. No.: 12/439,147

(22) PCT Filed: Aug. 16, 2007

(86) PCT No.: PCT/EP2007/058533
§ 371 (c)(1),
(2), (4) Date: Feb. 26, 2009

(87) PCT Pub. No.: WO2008/025684
PCT Pub. Date: Mar. 6, 2008

(65) Prior Publication Data
US 2011/0059223 A1  Mar. 10, 2011

(30) Foreign Application Priority Data
Aug. 28, 2006  (EP) .................... 06119639

(51) Int. Cl.
*A23G 1/00* (2006.01)

(52) U.S. Cl. ...................... 426/631; 426/231

(58) Field of Classification Search .......... 426/231, 426/631
See application file for complete search history.

(56) References Cited

U.S. PATENT DOCUMENTS

| | | | | |
|---|---|---|---|---|
| 4,588,604 A | * | 5/1986 | Baker et al. | 426/601 |
| 4,594,259 A | * | 6/1986 | Baker et al. | 426/613 |
| 4,679,498 A | * | 7/1987 | Chaveron et al. | 99/483 |
| 5,244,690 A | * | 9/1993 | Van der Schueren et al. | 426/660 |

(Continued)

FOREIGN PATENT DOCUMENTS

EP  0 489 515 A   6/1992
EP  0 512 910 A2  11/1992

OTHER PUBLICATIONS

Minifie, B. W. 1980. Chocolate, Cocoa and Confectionery: Science and Technology, 2nd edition. AVI Publishing Company, Westport, CT. p. 94-97.*

(Continued)

*Primary Examiner* — Carolyn Paden
(74) *Attorney, Agent, or Firm* — Knobbe Martens Olson & Bear, LLP

(57) ABSTRACT

The present invention relates to a novel method for conching chocolate, whereby a chocolate mass is submitted to a conching method that comprises the following steps: —a dry conching step performed at a temperature of between 50° C. and 70° C., —and subsequent a wet conching step performed at a temperature of between 60° C. and 110° C., more in particular at a temperature between 60° C. and 90° C., wherein the dry conching temperature and the wet conching temperature are comprised within the range(s) defined by the graph of FIG. 13 (see shaded or hatched regions). Most preferably the dry conching step is performed at about 60° C. and the wet conching step at about 60° C. or about 90° C. Advantageously, this adapted conching process conserves and even increases the antioxidant activity of a chocolate, in particular a dark chocolate. Consequently, the present invention further relates to a method of conserving and/or increasing the antioxidant activity of chocolate and to chocolates processed accordingly.

39 Claims, 7 Drawing Sheets

U.S. PATENT DOCUMENTS

Figure 1:

| | | | | |
|---|---|---|---|---|
| 5,275,835 A | * | 1/1994 | Masterson et al. | 426/607 |
| 5,332,588 A | * | 7/1994 | Capodieci | 426/231 |
| 5,360,621 A | * | 11/1994 | Mentink et al. | 426/548 |
| 5,460,840 A | * | 10/1995 | Capodieci | 426/231 |
| 5,589,216 A | * | 12/1996 | Guskey et al. | 426/607 |
| 5,591,476 A | * | 1/1997 | Capodieci | 426/631 |
| 5,676,995 A | * | 10/1997 | Cully et al. | 426/660 |
| 6,015,913 A | * | 1/2000 | Kealey et al. | 549/386 |
| 6,372,267 B1 | * | 4/2002 | Kealey et al. | 424/776 |
| 6,737,088 B1 | | 5/2004 | Kealey et al. | |
| 7,368,144 B2 | * | 5/2008 | Lecoupeau et al. | 426/655 |
| 2005/0175765 A1 | * | 8/2005 | Zaki | 426/631 |

OTHER PUBLICATIONS

International Search Report issued in corresponding PCT Application No. PCT/EP2007/058533, dated Dec. 11, 2007.

Liégeois et al., "Measuring Antioxidant Efficiency of Wort, Malt, and Hops Against the 2,2'-Azobis (2-amidinopropane) Dihydrochloride-Induced Oxidation of an Aqueous Dispersion of Linoleic Acid;" J. Agric. Food Chem. , vol. 48, pp. 1129-1134, 2000.

Wan et al., "Effects of Cocoa Powder and Dark Chocolate on LDL Oxidative Susceptibility and Prostaglandin Concentrations in Humans[1-3];" American Journal Clinical Nutrition, vol. 74, pp. 596-602, 2001.

Grassi et al., "Short-Term Administration of Dark Chocolate is Followed by a Significant Increase in Insulin Sensitivity and a Decrease in Blood Pressure in Healthy Persons[1-3] ;" American Journal Clinical Nutrition, vol. 81, pp. 611-614, 2005.

Buijsse et al., "Cocoa Intake, Blood Pressure, and Cardiovascular Mortality," Arch Intern Med., vol. 166, pp. 411-417, Feb. 27, 2006.

Sanbongi et al., "Polyphenols in Chocolate, Which Have Antioxidant Activity, Modulate Immune Functions in Humans in Vitro," Cellular Immunology, vol. 177, pp. 129-136, 1997.

Mursu et al., "Dark Chocolate Consumption Increases HDL Cholesterol Concentration and Chocolate Fatty Acids May inhibit Lipid Peroxidation in Healthy Humans," Free Radical Biology & Medicine, vol. 37, pp. 1351-1359, 2004.

Hermann et al., "Dark Chocolate Improves Endothelial and Platelet Function," Heart.bmjournals.com, vol. 92, pp. 119-120, Aug. 29, 2006.

Kondo, et al., "Inhibition of LDL Oxidation by Cocoa," The Lancet, vol. 346, p. 1514, Nov. 30, 1996.

Counet et al., "Effect of the Number of Flavanol Units on the Antioxidant Activity of Procyanidin Fractions Isolated from Chocolate," J. Agric. Food Chem., vol. 51, pp. 6816-6822, 2003.

Lee et al., "Cocoa Has More Phenolic Phytochemicals and a Higher Antioxidant Capacity than Teas and Red Wine," J. Agric. Food Chem., vol. 51, pp. 7292-7295, 2003.

Roura et al., Rapid Liquid Chromatography Tandem Mass Spectrometry Assay to Quantify Plasma(-) Epicatechin Metabolites after Ingestion of a Standard Portion of Cocoa Beverage in Humans, J. Agric. Food Chem., vol. 53, pp. 6190-6194, 2005.

Engler, et al., "Flavonoid-Rich Dark Chocolate Improves Endothelial Function and Increases Plasma Epicatechin Concentrations in Healthy Adults," Journal of the American College of Nutrition, vol. 23, No. 3, pp. 197-204, 2004.

Vansant et al., "Vrije Radicalen En Antioxidanten: Basisprincipes," Symposium-Antioxidanten en Voeding, Instituut Danone, Oct. 23, 2004.

Beckett, S.T., "Industrial Chocolate Manufacture and Use," Blackie Academic & Professional, Second Edition, pp. 118-121, 1994.

Ziegleder, Gottfried, "Conching," Information on the Britanniafood Website via http://www.britanniafood.com/download/?mode=dynamic&id=21, Jul. 2006.

Prior et al., "Can Foods Forestall Aging?," Agricultural Research, pp. 15-17, Feb. 1999.

Waterhouse et al., "Antioxidants in Chocolate," The Lancet, vol. 348, p. 834, Sep. 21, 1996.

* cited by examiner

METHOD TO INCREASE THE ANTIOXIDANT ACTIVITY OF CHOCOLATE

RELATED APPLICATIONS

This application is the U.S. National Phase filing under 35 U.S.C. §371 of PCT/EP2007/058533, filed Aug. 16, 2007, entitled "Method to Increase the Antioxidant Activity of Chocolate", which designated the United States and was published in English on Mar. 6, 2008, which claims priority under 35 U.S.C. §119(a)-(d) to European Patent Application No. 06119639.0, filed Aug. 28, 2006.

FIELD OF THE INVENTION

The present invention relates to a process for improving the antioxidant activity of chocolate, in a natural way and without the need to add any antioxidant components to the chocolate mass.

The invention further relates to a novel method for conching and preparing chocolate, as well as to any chocolate prepared according to a method of the invention.

BACKGROUND OF THE INVENTION

In the art processes have been described to maintain the antioxidant content of cocoa.

As an example, U.S. Pat. No. 6,660,332 discloses a cocoa bean processing technique that preserves the beneficial flavonoid compounds of cocoa beans in finished, cocoa bean-based foodstuffs.

This method avoids the significant losses of polyphenols that occur during conventional cocoa processing by removing a significant amount of said polyphenols prior to fermentation and/or roasting and then adding a portion of these polyphenols back.

In other methods that have been disclosed, antioxidant components/molecules are added at the end of the chocolate production process.

Typical preparation of "quality" chocolate consists of three stages: (1) mixing and possibly pre-grinding, (2) refining and most importantly (3) conching.

In the first step, the ingredients are mixed together in a kneader in order to get a paste. Generally, cocoa mass is mixed with sugar and possibly a small percentage of cocoa butter.

This paste may be subjected to a pre-grinding process in a 2-roll mill in order to obtain an overall fineness of about 150 µm. Sugar could also be pre-refined in a sugar mill.

In the second step, the actual refining step, the paste is passed on a multiple-roll equipment (generally with five rolls), where the fineness is reduced to an average of 10 to 30 µm. The product obtained is in powder form.

Most chocolate and certainly all "quality" products are then submitted to a third step, known already for a long time as "conching".

During conching, the chocolate is subjected to a prolonged mechanical mixing combined with heating. This is carried out in special vessels known as "conches".

Optional ingredients like cocoa butter and flavours are generally added at this stage.

Lecithin is hereby frequently added as an emulsifier to improve the rheological properties of chocolate, and thereby possibly enabling the amount of cocoa butter to be reduced. Other emulsifiers may also be used, like for example polyglycerol polyricinoleate and ammonium phosphatide.

During conching, the kneading action combined with high temperature causes evaporation of residual moisture and of some undesired volatile components such as acids generated during the fermentation of the cocoa beans.

The kneading action also leads to a better dispersion of sugar and cocoa particles in the fat phase formed by the cocoa butter released from the cocoa mass and possibly added.

The conching process results in the decrease of the viscosity and the yield value. At the end of the conching step, the chocolate has developed the right flavour and the desired rheological properties.

There are two types of conching operations, respectively known in the art as "dry" conching and "wet" conching (EP 0 489 515). In the following paragraphs: a description of a wet and dry conching as generally applied.

In "wet" (conventional) conching all the cocoa butter and other ingredients such as lecithin are added early in the process to maintain the fluidity of the mass which is then mechanically worked for a prolonged time, typically for about 20 or 30 hours or more, and at a relatively low temperature, typically at about 40° C. up to about 60° C.

The (conventional) "dry" conching process on the other hand is operated for a shorter time e.g. up to 20 hours but at a higher temperature mostly above 70° C. and usually about 90° C. for dark chocolate, and above 55° C. and usually around 80° for milk chocolate.

In this case, the extra cocoa butter and other ingredients are added towards the end of the conching period, e.g. about one hour before the end of the conching period. This last step (after the actual "dry conching") is commonly known as "liquid conching".

The aim of this treatment ("liquid conching") is to homogenize and to obtain a liquid pumpable mass (EP 0 489 515; Beckett, S. T., 1994; Information given on the britanniafood website, Ziegleder, G., 2006).

Due to the technological evolution of the process equipment these two conching operations are nowadays generally realized in a shorter period of about 8 up to about 24 hours.

In the course of this three-step process (mixing & pre-grinding; refining; conching) it is of utmost importance to protect and preserve the development of antioxidants in the chocolate, as these play an important role in the defence mechanism of the body against free radicals.

Free radicals are molecules or atoms with one or more unpaired electrons. Due to this characteristic they are very reactive.

Free radicals play an important role in a lot of biochemical reactions, such as the intracellular killing of bacteria's and in certain cell signalling processes (Van Sant, G., 2004; information given on "free radicals" at the wikipedia website).

However, because of their reactivity, free radicals can damage protein-, fat-, and DNA-molecules in the (human) body.

They are thought to be the cause of some of the aging symptoms and believed to induce a lot of diseases like Parkinson, schizophrenia and Alzheimer diseases ("free radicals", wikipedia website).

Free radicals are further involved in some of the main dead causes in the western world like some cancers types, coronary heart disease and cardiovascular diseases in general.

The body has a number of mechanisms to minimize these radical damages.

One of these defence mechanisms occurs through antioxidants. Antioxidants react with free radicals and by so doing make them harmless.

The best known antioxidants are the vitamins C, E, carotenoids and the polyphenols (Van Sant, G., 2004).

Polyphenols are a complex group of molecules which can be naturally found in the plant world. More than 8000 polyphenolic structures are known.

Polyphenols can be divided into different classes based upon their chemical structure: flavonoids, phenolic acids, stilbenes and lignans (Roura, E. et al., 2005).

Cocoa, the main ingredient of dark chocolate is rich in polyphenols, particularly in flavan-3-ols such as epicathechins, cathechins and procyanidins (Mursu, J. et al., 2004).

The primary family of flavanoids contributing to the antioxidant activity of chocolates is the procyanidins (Counet, C. & Collin, S., 2003). Their basic unit is a three-ring molecular structure (U.S. Pat. No. 6,660,332).

Procyanidins can be present as oligomers (2 to up to 10 flavan-3-ol units) or in the form of polymers with a higher degree of polymerization, the so called tannins.

The antioxidant activity of cocoa polyphenols is even higher than that of the more well-known antioxidant products like tea or wine (Lee, K. W. et al., 2003).

In 1999, the USDA (United State Department of Agriculture) has put plain chocolate on top of the list of antioxidant food (USDA, 1999).

The antioxidant capacity of cocoa products is further strengthened by the presence of melanoidins (Counet, C. & Collin, S., 2003).

Melanoidins are polyfunctional macromolecules formed by Maillard reactions. These brown nitrogen containing polymers with a molecular weight between 1,000 and 100,000 Da may also have phenolic units included in their structure.

Lately, more and more evidence has been found for the health benefits of eating dark chocolate.

Dark chocolate or cocoa consumption is supposed to favourably affect cardiovascular disease risk by slowing down LDL oxidation (Mursu, J. et al., 2004; Wan, Y. et al., 2001; Kondo, K. et al., 1996; Waterhouse, A. L. et al., 1996), increasing serum total antioxidant activity and HDL-cholesterol concentrations, and not adversely affecting prostaglandins (Wan, Y. et al., 2001).

The antioxidant activity of cocoa products is also beneficial as a defence against reactive oxygen species which are involved in immune response (Sanbongi, C. et al., 1997), and it is associated with improvement in endothelial and platelet function (Engler, M. B. et al., 2004; Hemann, F. et al., 2006) and with lowered blood pressure (Grassi, D. et al, 2005; Buijsse, B. et al., 2006).

Chocolate is considered as a widely consumed food. It is therefore highly desirable to develop processes that will provide chocolate contributing to general health improvement.

AIMS OF THE INVENTION

Aim is to provide an improved chocolate which has greater ability to quench oxidative stress and destroy free radicals than chocolate produced by conventional methods.

It is yet another aim to provide adapted production processes which can achieve this.

Aim of these adapted processes is to conserve and even increase the antioxidant activity of a chocolate in a natural way, without (negatively) affecting the taste or any other desired properties of chocolate.

SUMMARY OF THE INVENTION

A first aspect of the invention relates to a modified conching process.

The invention in particular relates to a method for conching chocolate, e.g. dark chocolate, whereby a chocolate mass is submitted to a conching process comprising (consisting of) the following (successive) steps:

a dry conching step performed at a temperature of between about 50° C. and about 70° C., and subsequent a wet conching step performed at a temperature of between about 60° C. and about 110° C.

Preferably the dry and wet conching steps each last for about 1 to 2 hours up to about 12 hours, especially for about 6 up to about 12 hours. The conching process of the invention may be carried out in equipment conventionally used for this purpose. A different conche may be used for each of the conching steps, yet the dry and wet conching steps may also be performed in one and the same conche.

Preferably, the dry conching step is performed at about 60° C. and preferably lasts for about 6 hours.

According to a preferred embodiment, the wet conching step is performed at about 60° C. and preferably lasts for about 6 hours.

According to another and even more preferred embodiment, the wet conching step is performed at about 90° C. and preferably lasts for about 6 hours.

In case a cocoa mass is used that is very rich in flavanoids (such as the Madagascar type, e.g.) then the second step of the conching process (the wet conching phase or step at preferably 60° C. or 90° C.) may possibly be reduced in time to e.g. about 3 hours.

Often, cooling of the chocolate mass (e.g. through the use of water cooling) is necessary to (obtain and) maintain a temperature of between about 50° C. and about 70° C., preferably of about 60° C., during the dry conching step.

Similarly, the chocolate mass may have to be heated to (obtain and) maintain a temperature of between about 60° C. and about 110° C., preferably of about 60° C. or about 90° C. (e.g. by using water heating), during the wet conching step.

Advantageously, an (at least one) emulsifier and/or fat is added (immediately or just) after the dry conching step to obtain a paste that can be submitted to a wet conching step. Advantageously, emulsifiers and/or fat are added after the dry conching step, yet before the wet conching step. In particular said (at least one) emulsifier and/or said (at least one) fat is/are added to obtain a liquid pumpable mass, whereafter conching is continued (the second step, the wet conching, for the particular temperature conditions applied in a method of the invention see supra and infra). The amounts needed to pass from a dry to a liquid texture are well known in the art.

Typical emulsifiers are lecithin, polyglycerol polyricinoleate, ammonium phosphatide or any mixture of these. Typical fats are cocoa butter, milk fat and/or some allowed vegetable fats. Preferred emulsifiers/fats are traditionally lecithin and/or cocoa butter. Lecithin typically is added in a concentration of between 0.1% and 1%, more preferably between 0.4% and 0.6%, most preferably about 0.5 w/w % (percentage on the total chocolate mass).

An emulsifier that may be used in the invention is polyglycerol polyricinoleate. Yet a preferred emulsifier is lecithin. A preferred fat is cocoa butter.

In an embodiment of the invention lecithin was added (just) before starting a wet conching step according to the invention (at a temperature between about 60° C. and about 110° C., more preferably either at about 60° C. or about 90° C.) Lecithin typically is added in a concentration of between 0.1% and 1%, more preferably in an amount between 0.4% and 0.6%, most preferably about 0.5 w/w % of lecithin is added (percentage on the total chocolate mass).

In another embodiment of the invention only cocoa butter was added (and no lecithin or any other emulsifier) to change the texture from dry to liquid. Cocoa butter herein replaced the emulsifier (in particular lecithin). It is well known in the art that 1 part of lecithin has the same effect on viscosity as about 10 to about 20 parts, more in particular about 15 parts of cocoa butter.

In an embodiment of the invention, dry conching is performed at a temperature between about 50° C. and about 70° C., and wet conching at about 60° C. or about 90° C. Preferably the wet conching step lasts for about 6 hours. Preferably, also dry conching lasts for about 6 hours. Preferably dry conching is performed at a temperature between about 55° C. and about 65° C. and preferably lasts for about 6 to about 10 to 12 hours. Dry conching in this temperature range is advantageously followed by wet conching at about 60° C. or about 90° C.

Lactose and/or amino acids such as phenylalanine, arginine, glycine and lysine may be added during the conching process to enhance the production of antioxidant molecules such as melanoidins.

Advantageously, the viscosity of the chocolate is adjusted by adding fat and/or cocoa mass after conching. The required viscosity, and thus the amount of fat and/or cocoa mass to add, depends on the application as known in the art. Cocoa mass that is added preferentially has undergone a heating step for a prolonged time at an elevated temperature. Most preferably it has undergone a heating step for about 12 hours at about 90° C.

It was surprisingly found that a conching process according to the invention has no negative effect on the antioxidant activity of a chocolate or chocolate mass. To the contrary, the antioxidant activity is advantageously conserved (preserved, maintained, is not changing significantly over the whole conching period), or even increases (compared to the antioxidant activity just before the conching process, t=0) with such method.

Advantageously, the antioxidant activity increases by at least 5%, 10% or 15%. Increases of up to 20% or even up to 40% are possible.

Accordingly, a second aspect of the invention concerns a method to conserve and/or increase the antioxidant activity of a chocolate or a chocolate mass (during the conching process) by submitting a chocolate mass, e.g. a dark chocolate mass, to a conching process comprising (consisting of) the following steps:
   a dry conching step performed at a temperature of between about 50° C. and about 70° C.,
   and subsequent a wet conching step performed at a temperature of between about 60° C. and about 110° C.
In particular, the chocolate mass submitted to conching is a dark chocolate mass.

In particular, provided is a conching method in the production of chocolate (in particular dark chocolate) for conserving and/or increasing the antioxidant activity of a chocolate mass (in particular a dark chocolate mass), said method comprising the step of submitting a chocolate mass (in particular a dark chocolate mass) to a conching process that comprises the following steps:
   a dry conching step performed at a temperature of between about 50° C. and about 70° C.,
   and subsequent a wet conching step performed at a temperature of between about 60° C. and about 110° C.

With a method of the invention the antioxidant activity is conserved during conching. Advantageously said antioxidant activity is increased (compared to t=0, the moment of starting conching) with a method of the invention.

We refer to the paragraphs above (or infra) for the preferred conditions of temperature and time, the possible addition of further ingredients etc.

Typically in a method of the invention the dry and wet conching step each last for 1 to 2 hours up to 12 hours, especially for 6 up to 12 hours, or for 6 to about 10 to 12 hours. Typically, the dry and wet conching step each last for about 6 hours.

In some cases an increase in antioxidant activity (compared to t=0) was obtained when the wet conching step took only 1 hour, possibly 2 hours. In other cases, the wet conching step took preferably at least 3 hours, 4 hours or 5 hours. Optimal results were most often obtained when the wet conching step lasted for 6 hours, for 6 up to 12 hours, for 6 to about 10 to 12 hours.

With a method of the invention an increase in antioxidant activity (compared to t=0) could advantageously be obtained. Increases in antioxidant activity by at least 5%, 10% or 15% e.g. were obtained. Increases of up to 20% or even up to 40% are possible.

Preferably in a method of the invention (any of the above) the dry conching step is performed at about 60° C. and preferably lasts for 6 hours.

Preferably in a method of the invention (any of the above) the wet conching step is performed at about 60° C. and preferably lasts for 6 hours.

Preferably in a method of the invention (any of the above) the wet conching step is performed at about 90° C. and preferably lasts for 6 hours.

Particularly good results were obtained when a dry conching step at a temperature between about 50° C. and about 70° C., more in particular at a temperature between (about) 55° C. and (about) 65° C., and lasting in particular for about 6 to about 10 to 12 hours, was followed by a wet conching step at about 60° C. Excellent results were obtained when a dry conching step at about 60° C., which preferably lasted for (about) 6 hours, was followed by a wet conching step at about 60° C., which preferably also lasted for (about) 6 hours.

Particularly good results were also obtained when a dry conching step at a temperature between about 50° C. and about 70° C., more in particular at a temperature between (about) 55° C. and (about) 65° C. and lasting in particular for about 6 to about 10 to 12 hours, was followed by a wet conching step at about 90° C. Excellent results were obtained when a dry conching step at about 60° C., which preferably lasted for (about) 6 hours, was followed by a wet conching step at about 90° C., which preferably lasted for (about) 6 hours.

The chocolate (mass) may herein be a dark or a milk chocolate (mass), but most preferably is a dark chocolate (mass).

Examples of suitable dark chocolate recipes are given in the examples, where chocolates were prepared e.g. from a cocoa mass of the type Côte d'Ivoire or Madagascar. These examples are not limiting as a person skilled in the art will recognize. Other recipes may be used.

Advantageously in a method for conserving and/or increasing the antioxidant activity according to the invention (any of the above), the chocolate mass is cooled to (obtain and) maintain a temperature between (about) 50° C. and (about) 70° C., preferably of about 60° C., during the dry conching step.

Advantageously in such method (any of the above), the chocolate mass is heated to (obtain and) maintain a temperature between (about) 60° C. and (about) 110° C., preferably about 60° C. or about 90° C., during the wet conching step.

In a method for conserving and/or increasing the antioxidant activity according to the invention (any of the above) advantageously an emulsifier selected from the group consisting of lecithin, polyglycerol polyricinoleate and ammonium phosphatide and/or fat is added after the dry conching step, yet before the wet conching step. Polyglycerol polyricinoleate can e.g. be used as emulsifier. Yet a preferred emulsifier is lecithin. A preferred fat is cocoa butter.

Lecithin and/or cocoa butter advantageously are added after the dry conching step (to pass from a dry texture to a pumpable mass). In a preferred embodiment of the invention lecithin is added after the dry conching step and before the wet conching step to change the texture from dry to wet. In another embodiment of the invention only cocoa butter is employed for this reason. For preferred amounts of lecithin and cocoa butter according to these embodiments, see above/infra.

In a method of the invention for conserving and/or increasing antioxidant activity (any of the above), after conching the viscosity of the chocolate may be adjusted by adding fat and/or cocoa mass. Advantageously the cocoa mass that is then added has undergone a heating step for a prolonged time at an elevated temperature, most preferably has undergone a heating step for about 12 hours at about 90° C.

In a particular embodiment of the invention, dry conching is performed at a temperature between about 50° C. and about 70° C., and wet conching at about 60° C. or about 90° C. More preferably dry conching according to the invention takes place at a temperature between (about) 55° C. and (about) 65° C. and preferably lasts for about 6 to about 10 to 12 hours.

Apart from the specific examples provided above, the following also proved advantageous when a dark chocolate mass was dry conched at about 70° C., followed by a wet conching at about 60° C.; or dry conched at about 50° C., followed by a wet conching at about 90° C. e.g.

For some other combinations of dry and wet conching, no increase in antioxidant activity was found. Though the decrease in antioxidant activity (at the end of the conching process) was still (significantly) less than when applying a conching method of the art.

This finding led to a further investigation of suitable dry and wet conching temperature conditions to conserve and/or increase antioxidant activity of a dark chocolate during conching.

Surprisingly and unexpectedly a sand glass-type of correlation appeared to exist in the indicated temperature ranges of dry and wet conching (from about 50° C. to about 70° C. for dry conching and from about 60° C. to about 110° C., more in particular from about 60° C. to about 90° C. for wet conching).

Figure 13:
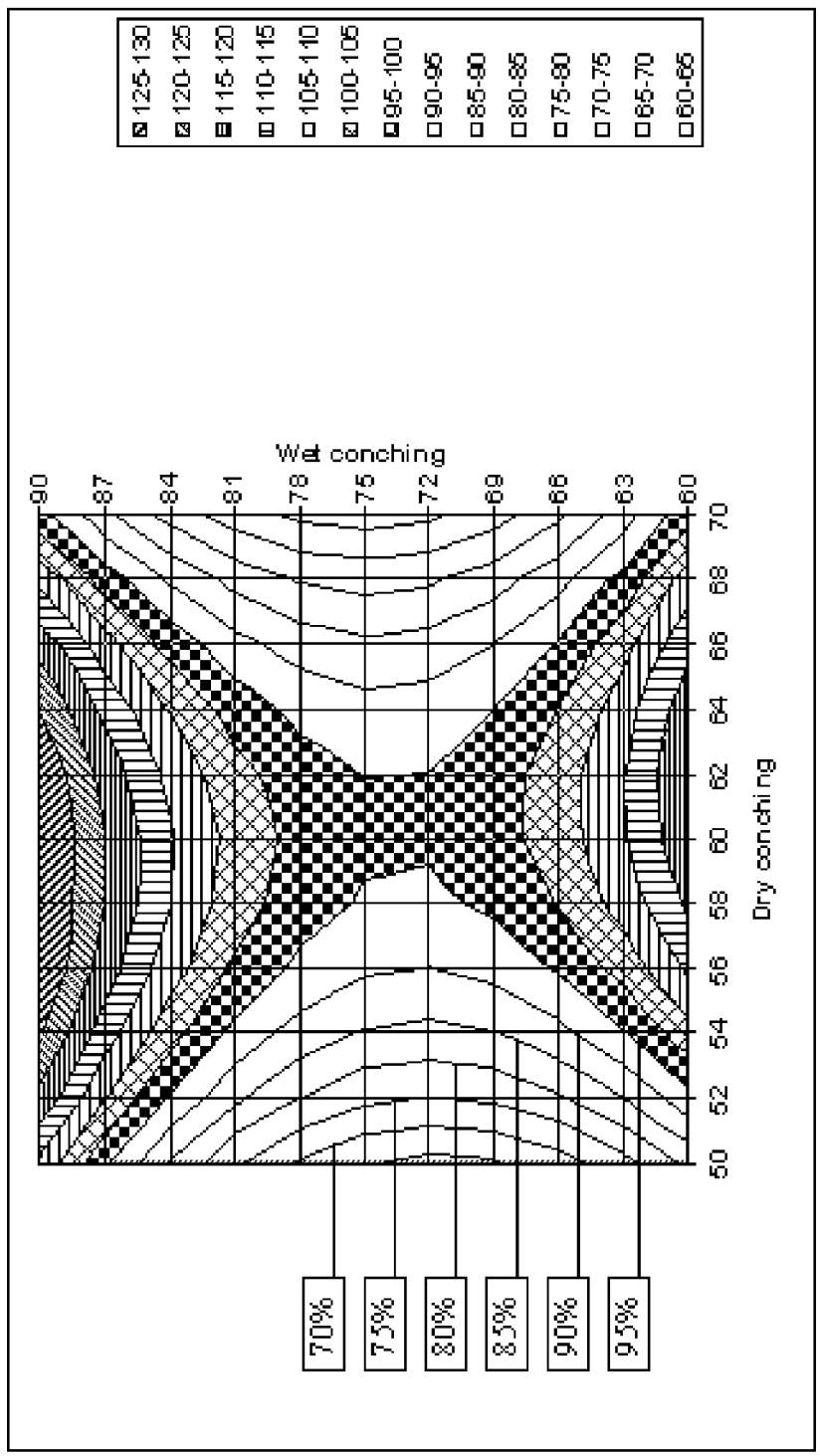

FIG. 13 (hatched or shaded regions) gives a view on suitable combinations of dry and wet conching which result in the desired effect: conservation and/or increase of antioxidant activity during conching (reference value: t=0).

Because of the accuracy of the measuring method (5%) the cut-off is set at 95% (see checkerboard pattern) yet advantageously the antioxidant activity (at the end of the conching method) is increased compared to the activity at t=0 (see other shadings or hatchings, values >100%) with a method of the invention. Values of 95% or above are thus considered to fall within the scope of a method of the invention (for conserving and/or increasing the antioxidant activity).

Accordingly, another aspect of the invention concerns a method to conserve and/or increase the antioxidant activity of a chocolate mass, in particular a dark chocolate mass during conching, said method comprising the step of submitting a chocolate mass, in particular a dark chocolate mass to a conching process that comprises the following steps:

a dry conching step performed at a temperature of between about 50° C. and about 70° C., and subsequent a wet conching step performed at a temperature of between about 60° C. and about 110° C., wherein the dry conching temperature and the wet conching temperature (for conserving and/or increasing the antioxidant activity) are comprised within the range(s) defined by the graph of FIG. 13. Advantageously both the temperatures (of dry and wet conching) are within the frame (or range(s)) defined by FIG. 13. The wet conching step advantageously is performed at a temperature between about 60° C. and about 90° C.

FIG. 13 illustrates in particular which dry and wet conching temperatures may be combined in order to conserve and/or increase the antioxidant activity during conching.

In particular, provided is a method to conserve and/or increase the antioxidant activity of a chocolate mass, in particular a dark chocolate mass, during conching, said method comprising the step of submitting a chocolate mass, in particular a dark chocolate mass, to a conching process that comprises the following steps:

a dry conching step, in particular a dry conching step performed at a temperature of between about 50° C. and about 70° C., and subsequent a wet conching step, in particular a wet conching step performed at a temperature of between about 60° C. and about 110° C., more in particular a wet conching step performed at a temperature of between about 60° C. and about 90° C., wherein temperatures for dry and wet conching are comprised within the range(s) of the (following) list:

| | Dry conching (about) | Wet conching (about) |
|---|---|---|
| 1 | 50-69 | 88-90; |
| 2 | 50-68 | 87-88; |
| 3 | 51-67 | 86-87; |
| 4 | 52-67 | 85-86; |
| 5 | 53-66 | 83-85; |
| 6 | 54-65 | 82-83; |
| 7 | 55-65 | 81-82; |
| 8 | 56-64 | 80-81; |
| 9 | 56-63 | 79-80; |
| 10 | 57-63 | 78-79; |
| 11 | 58-62 | 76-78; |
| 12 | 59-61 | 73-76; |
| 13 | 60-61 | 71-73; |
| 14 | 59-62 | 70-71; |
| 15 | 58-63 | 68-70; |
| 16 | 57-64 | 67-68; |
| 17 | 57-65 | 66-67; |
| 18 | 56-66 | 64-66; |
| 19 | 55-67 | 63-64; |
| 20 | 55-68 | 62-63; |
| 21 | 54-69 | 61-62; |
| 22 | 53-69 | 60-61 |

In particular, provided is a method to conserve and/or increase the antioxidant activity of a chocolate mass, in particular a dark chocolate mass during conching, said method comprising the step of submitting a chocolate mass, in particular a dark chocolate mass to a conching process that comprises the following steps:

a dry conching step and subsequent a wet conching step, wherein temperatures for dry and wet conching are comprised within the range(s) of the list:

|    | Dry conching (about) | Wet conching (about) |
|----|----------------------|----------------------|
| 1  | 50-69                | 88-90;               |
| 2  | 50-68                | 87-88;               |
| 3  | 51-67                | 86-87;               |
| 4  | 52-67                | 85-86;               |
| 5  | 53-66                | 83-85;               |
| 6  | 54-65                | 82-83;               |
| 7  | 55-65                | 81-82;               |
| 8  | 56-64                | 80-81;               |
| 9  | 56-63                | 79-80;               |
| 10 | 57-63                | 78-79;               |
| 11 | 58-62                | 76-78;               |
| 12 | 59-61                | 73-76;               |
| 13 | 60-61                | 71-73;               |
| 14 | 59-62                | 70-71;               |
| 15 | 58-63                | 68-70;               |
| 16 | 57-64                | 67-68;               |
| 17 | 57-65                | 66-67;               |
| 18 | 56-66                | 64-66;               |
| 19 | 55-67                | 63-64;               |
| 20 | 55-68                | 62-63;               |
| 21 | 54-69                | 61-62;               |
| 22 | 53-69                | 60-61                |

In the above table each row corresponds to advantageous combinations of dry and wet conching temperatures, to particular temperature ranges (or temperatures) for dry and wet conching respectively. For instance in a method of the invention (for conserving and/or increasing the antioxidant activity of a chocolate, in particular a dark chocolate) a dry conching step at a temperature between about 50° C. and about 69° C. advantageously is followed by a wet conching step at a temperature between about 88° C. and about 90° C. (row 1), a dry conching step at a temperature between about 50° C. and about 68° C. advantageously is followed by a wet conching step at a temperature between about 87° C. and about 88° C. (row 2), etc. For the term "about", "around" or "near" as used herein when referring to temperatures: the temperature ±0.5° C., more preferably ±0.4° C.

In an embodiment of the invention, temperatures for dry and wet conching are comprised within the range(s) of the above list, with the proviso that the dry conching temperature is not about 60° C., or except the following: a dry conching step at about 60° C. followed by a wet conching step at about 60° C., or a dry conching step at about 60° C. followed by a wet conching step at about 90° C.

In particular temperatures for dry and wet conching are comprised within the range(s) of the (following) list:

|    | Dry conching (about) | Wet conching (about) |
|----|----------------------|----------------------|
| 1  | 50-69                | 89-90;               |
| 2  | 50-69                | 88-89;               |
| 3  | 50-68                | 87-88;               |
| 4  | 51-67                | 86-87;               |
| 5  | 52-67                | 85-86;               |
| 6  | 53-66                | 83-85;               |
| 7  | 54-65                | 82-83;               |
| 8  | 55-65                | 81-82;               |
| 9  | 56-64                | 80-81;               |
| 10 | 56-63                | 79-80;               |
| 11 | 57-63                | 78-79;               |
| 12 | 58-62                | 76-78;               |
| 13 | 59-61                | 73-76;               |
| 14 | 60-61                | 71-73;               |
| 15 | 59-62                | 70-71;               |
| 16 | 58-63                | 68-70;               |
| 17 | 57-64                | 67-68;               |
| 18 | 57-65                | 66-67;               |
| 19 | 56-66                | 64-66;               |
| 20 | 55-67                | 63-64;               |
| 21 | 55-68                | 62-63;               |
| 22 | 54-69                | 61-62;               |
| 23 | 53-69                | 61;                  |
| 24 | 53-69                | 60                   |

Possibly temperatures for dry and wet conching are comprised within the range(s) of the (following) list:

|    | Dry conching (about) | Wet conching (about) |
|----|----------------------|----------------------|
| 1  | 50-69                | 88-89;               |
| 2  | 50-68                | 87-88;               |
| 3  | 51-67                | 86-87;               |
| 4  | 52-67                | 85-86;               |
| 5  | 53-66                | 83-85;               |
| 6  | 54-65                | 82-83;               |
| 7  | 55-65                | 81-82;               |
| 8  | 56-64                | 80-81;               |
| 9  | 56-63                | 79-80;               |
| 10 | 57-63                | 78-79;               |
| 11 | 58-62                | 76-78;               |
| 12 | 59-61                | 73-76;               |
| 13 | 60-61                | 71-73;               |
| 14 | 59-62                | 70-71;               |
| 15 | 58-63                | 68-70;               |
| 16 | 57-64                | 67-68;               |
| 17 | 57-65                | 66-67;               |
| 18 | 56-66                | 64-66;               |
| 19 | 55-67                | 63-64;               |
| 20 | 55-68                | 62-63;               |
| 21 | 54-69                | 61-62;               |
| 22 | 53-69                | 61;                  |

In a preferred embodiment of the invention temperatures for dry and wet conching are comprised within the range(s) of the (following) list:

|    | Dry conching (about) | Wet conching (about) |
|----|----------------------|----------------------|
| 1  | 50-68                | 88-90;               |
| 2  | 51-67                | 87-88;               |
| 3  | 52-66                | 86-87;               |
| 4  | 53-66                | 85-86;               |
| 5  | 54-65                | 84-85;               |
| 6  | 55-64                | 83-84;               |
| 7  | 56-63                | 82-83;               |
| 8  | 57-62                | 81-82;               |
| 9  | 58-62                | 80-81;               |
| 10 | 60-62                | 66-67;               |
| 11 | 58-64                | 65-66;               |
| 12 | 57-65                | 64-65;               |
| 13 | 57-66                | 63-64;               |
| 14 | 56-67                | 62-63;               |
| 15 | 55-68                | 61-62;               |
| 16 | 54-68                | 60-61                |

In an embodiment of the invention, temperatures for dry and wet conching are comprised within the range(s) of the above list, with the proviso that the dry conching temperature is not about 60° C., or except the following: a dry conching step at about 60° C. followed by a wet conching step at about 60° C., or a dry conching step at about 60° C. followed by a wet conching step at about 90° C.

In particular temperatures for dry and wet conching are comprised within the range(s) of the (following) list:

|    | Dry conching (about) | Wet conching (about) |
|----|----------------------|----------------------|
| 1  | 50-68                | 89-90;               |
| 2  | 50-68                | 88-89;               |
| 3  | 51-67                | 87-88;               |
| 4  | 52-66                | 86-87;               |
| 5  | 53-66                | 85-86;               |
| 6  | 54-65                | 84-85;               |
| 7  | 55-64                | 83-84;               |
| 8  | 56-63                | 82-83;               |
| 9  | 57-62                | 81-82;               |
| 10 | 58-62                | 80-81;               |
| 11 | 60-62                | 66-67;               |
| 12 | 58-64                | 65-66;               |
| 13 | 57-65                | 64-65;               |
| 14 | 57-66                | 63-64;               |
| 15 | 56-67                | 62-63;               |
| 16 | 55-68                | 61-62;               |
| 17 | 54-68                | 61;                  |
| 18 | 54-68                | 60                   |

Possibly temperatures for dry and wet conching are comprised within the range(s) of the (following) list:

|    | Dry conching (about) | Wet conching (about) |
|----|----------------------|----------------------|
| 1  | 50-68                | 88-89;               |
| 2  | 51-67                | 87-88;               |
| 3  | 52-66                | 86-87;               |
| 4  | 53-66                | 85-86;               |
| 5  | 54-65                | 84-85;               |
| 6  | 55-64                | 83-84;               |
| 7  | 56-63                | 82-83;               |
| 8  | 57-62                | 81-82;               |
| 9  | 58-62                | 80-81;               |
| 10 | 60-62                | 66-67;               |
| 11 | 58-64                | 65-66;               |
| 12 | 57-65                | 64-65;               |
| 13 | 57-66                | 63-64;               |
| 14 | 56-67                | 62-63;               |
| 15 | 55-68                | 61-62;               |
| 16 | 54-68                | 61                   |

In yet another preferred embodiment of the invention temperatures for dry and wet conching are comprised within the range(s) of the (following) list:

|    | Dry Conching (about) | Wet conching (about) |
|----|----------------------|----------------------|
| 1  | 56-67                | 60-61;               |
| 2  | 57-66                | 61-62;               |
| 3  | 58-65                | 62-63;               |
| 4  | 59-64                | 63-64;               |
| 5  | 60-62                | 64-65;               |
| 6  | 50-68                | 89-90;               |
| 7  | 51-67                | 88-89;               |
| 8  | 52-66                | 87-88;               |
| 9  | 53-65                | 86-87;               |
| 10 | 54-64                | 85-86;               |
| 11 | 56-63                | 84-85;               |
| 12 | 57-62                | 83-84;               |
| 13 | 58-61                | 82-83                |

In an embodiment of the invention, temperatures for dry and wet conching are comprised within the range(s) of the above list, with the proviso that the dry conching temperature is not about 60° C., or except the following: a dry conching step at about 60° C. followed by a wet conching step at about 60° C., or a dry conching step at about 60° C. followed by a wet conching step at about 90° C.

In particular temperatures for dry and wet conching are comprised within the range(s) of the (following) list:

|    | Dry Conching (about) | Wet conching (about) |
|----|----------------------|----------------------|
| 1  | 56-67                | 60;                  |
| 2  | 56-67                | 61;                  |
| 3  | 57-66                | 61-62;               |
| 4  | 58-65                | 62-63;               |
| 5  | 59-64                | 63-64;               |
| 6  | 60-62                | 64-65;               |
| 7  | 50-68                | 90;                  |
| 8  | 50-68                | 89;                  |
| 9  | 51-67                | 88-89;               |
| 10 | 52-66                | 87-88;               |
| 11 | 53-65                | 86-87;               |
| 12 | 54-64                | 85-86;               |
| 13 | 56-63                | 84-85;               |
| 14 | 57-62                | 83-84;               |
| 15 | 58-61                | 82-83                |

Possibly temperatures for dry and wet conching are comprised within the range(s) of the (following) list:

|    | Dry Conching (about) | Wet conching (about) |
|----|----------------------|----------------------|
| 1  | 56-67                | 61;                  |
| 2  | 57-66                | 61-62;               |
| 3  | 58-65                | 62-63;               |
| 4  | 59-64                | 63-64;               |
| 5  | 60-62                | 64-65;               |
| 6  | 50-68                | 89;                  |
| 7  | 51-67                | 88-89;               |
| 8  | 52-66                | 87-88;               |
| 9  | 53-65                | 86-87;               |
| 10 | 54-64                | 85-86;               |
| 11 | 56-63                | 84-85;               |
| 12 | 57-62                | 83-84;               |
| 13 | 58-61                | 82-83                |

In yet another preferred embodiment of the invention temperatures for dry and wet conching are comprised within the range(s) of the (following) list:

|    | Dry conching (about) | Wet conching (about) |
|----|----------------------|----------------------|
| 1  | 57-66                | 60-61;               |
| 2  | 59-64                | 61-62;               |
| 3  | 52-66                | 89-90;               |
| 4  | 53-66                | 88-89;               |
| 5  | 54-65                | 87-88;               |
| 6  | 55-64                | 86-87;               |
| 7  | 56-62                | 85-86;               |
| 8  | 58-61                | 84-85                |

In an embodiment of the invention, temperatures for dry and wet conching are comprised within the range(s) of the above list, with the proviso that the dry conching temperature is not about 60° C., or except the following: a dry conching step at about 60° C. followed by a wet conching step at about 60° C., or a dry conching step at about 60° C. followed by a wet conching step at about 90° C.

In particular temperatures for dry and wet conching are comprised within the range(s) of the (following) list:

|   | Dry conching (about) | Wet conching (about) |
|---|---|---|
| 1 | 57-66 | 60; |
| 2 | 57-66 | 61; |
| 3 | 59-64 | 61-62; |
| 4 | 52-66 | 90; |
| 5 | 52-66 | 89; |
| 6 | 53-66 | 88-89; |
| 7 | 54-65 | 87-88; |
| 8 | 55-64 | 86-87; |
| 9 | 56-62 | 85-86; |
| 10 | 58-61 | 84-85 |

Possibly temperatures for dry and wet conching are comprised within the range(s) of the (following) list:

|   | Dry conching (about) | Wet conching (about) |
|---|---|---|
| 1 | 57-66 | 61; |
| 2 | 59-64 | 61-62; |
| 3 | 52-66 | 89; |
| 4 | 53-66 | 88-89; |
| 5 | 54-65 | 87-88; |
| 6 | 55-64 | 86-87; |
| 7 | 56-62 | 85-86; |
| 8 | 58-61 | 84-85 |

In yet another preferred embodiment of the invention temperatures for dry and wet conching are comprised within the range(s) of the (following) list:

|   | Dry conching (about) | Wet conching (about) |
|---|---|---|
| 1 | 60-63 | 60-61; |
| 2 | 53-65 | 89-90; |
| 3 | 54-64 | 88-89; |
| 4 | 55-63 | 87-88; |
| 5 | 57-61 | 86-87 |

In an embodiment of the invention, temperatures for dry and wet conching are comprised within the range(s) of the above list, with the proviso that the dry conching temperature is not about 60° C., or except the following: a dry conching step at about 60° C. followed by a wet conching step at about 60° C., or a dry conching step at about 60° C. followed by a wet conching step at about 90° C.

In particular temperatures for dry and wet conching are comprised within the range(s) of the (following) list:

|   | Dry conching (about) | Wet conching (about) |
|---|---|---|
| 1 | 60-63 | 60; |
| 2 | 60-63 | 61; |
| 3 | 53-65 | 90; |
| 4 | 53-65 | 89; |
| 5 | 54-64 | 88-89; |
| 6 | 55-63 | 87-88; |
| 7 | 57-61 | 86-87 |

Possibly temperatures for dry and wet conching are comprised within the range(s) of the (following) list:

|   | Dry conching (about) | Wet conching (about) |
|---|---|---|
| 1 | 60-63 | 61; |
| 2 | 53-65 | 89; |
| 3 | 54-64 | 88-89; |
| 4 | 55-63 | 87-88; |
| 5 | 57-61 | 86-87 |

In yet another preferred embodiment of the invention In particular temperatures for dry and wet conching are comprised within the range(s) of the (following) list:

|   | Dry conching (about) | Wet conching (about) |
|---|---|---|
| 1 | 54-64 | 89-90; |
| 2 | 56-62 | 88-89; |
| 3 | 58-60 | 87-88 |

In an embodiment of the invention, temperatures for dry and wet conching are comprised within the range(s) of the above list, with the proviso that the dry conching temperature is not about 60° C., or except the following: a dry conching step at about 60° C. followed by a wet conching step at about 60° C., or a dry conching step at about 60° C. followed by a wet conching step at about 90° C.

In particular temperatures for dry and wet conching are comprised within the range(s) of the (following) list:

|   | Dry conching (about) | Wet conching (about) |
|---|---|---|
| 1 | 54-64 | 90; |
| 2 | 54-64 | 89; |
| 3 | 56-62 | 88-89; |
| 4 | 58-60 | 87-88 |

Possibly temperatures for dry and wet conching are comprised within the range(s) of the (following) list:

|   | Dry conching (about) | Wet conching (about) |
|---|---|---|
| 1 | 54-64 | 89; |
| 2 | 56-62 | 88-89; |
| 3 | 58-60 | 87-88 |

In yet another embodiment of the invention a chocolate mass, in particular a dark chocolate mass is subjected to a conching method comprising: a dry conching step at a temperature between about 56° C. and about 62° C. and subsequent a wet conching step at a temperature between about 89° C. and about 90° C., at about 89° C., or about 90° C.

In an embodiment of the invention, a dry conching step is performed at a temperature between about 50° C. and about 70° C., in particular at a temperature between about 50° C. and about 69° C., more in particular at a temperature between (about) 55° C. and (about) 65° C., and a wet conching step is performed at about 60° C. In a particular embodiment dry conching is performed at about 60° C. and wet conching at about 60° C.

In another embodiment of the invention, a dry conching step is performed at a temperature between about 50° C. and about 70° C., more particular at a temperature between (about) 55° C. and (about) 65° C., and a wet conching step is performed at about 90° C. In a particular embodiment dry conching is performed at about 60° C. and wet conching at about 90° C.

In another embodiment of the invention, a dry conching step is performed at a temperature between (about) 55° C. and (about) 65° C., followed by a wet conching step at a temperature between about 81° C. and about 90° C., more preferably between about 84° C. and about 90° C. or between about 84° C. and about 89° C.

In yet another embodiment of the invention, a dry conching step is performed at a temperature between (about) 55° C. and (about) 65° C., followed by a wet conching step at a temperature between about 60° C. and about 63° C., more preferably between about 61° C. and about 63° C.

In yet another embodiment of the invention, a dry conching step is performed at a temperature between about 59° C. and about 62° C., followed by a wet conching step at a temperature between about 60° C. and about 110° C., more preferably between about 60° C. and about 90° C., or between about 61° C. and about 89° C.

In yet another embodiment of the invention, a dry conching step is performed at a temperature between about 53° C. and about 59° C., followed by a wet conching step at a temperature between about 84° C. and about 110° C., more preferably between about 84° C. and about 90° C., or between about 84° C. and about 89° C.

In yet another embodiment of the invention, a dry conching step is performed at a temperature between about 62° C. and about 67° C., preferably between about 62° C. and about 66° C., followed by a wet conching step at a temperature between about 84° C. and about 110° C., more preferably between about 84° C. and about 90° C., or between about 84° C. and about 89° C.

In yet another embodiment of the invention, a dry conching step is performed at a temperature between about 55° C. and about 59° C., preferably between about 56° C. and about 59° C., followed by a wet conching step at a temperature between about 60° C. and about 62° C., more preferably between about 61° C. and about 62° C.

In yet another embodiment of the invention, a dry conching step is performed at a temperature between about 62° C. and about 66° C., preferably between about 62° C. and about 65° C., followed by a wet conching step at a temperature between about 60° C. and about 65° C., more preferably between about 60° C. and about 64° C. or between about 61° C. and about 64° C.

Typically the dry conching step and the wet conching step each last for 1 to 2 hours up to 12 hours, especially for 6 up to 12 hours, for 6 to about 10 to 12 hours. Typically dry conching lasts for about 4 hours, about 5 hours, more typically for about 6 hours. Alternatively the dry conching step may last for about 6 to about 10 to 12 hours.

Depending on the case, the wet conching step will last for at least 1 hour, at least 2 hours, preferably for at least 3 hours, at least 4 hours, at least 5 hours, most preferably lasts for about 6 hours, about 7 hours. Optimal results (excellent increases in antioxidant activity) were often obtained when the wet conching step lasted for about 6 hours.

In a method of the invention the chocolate mass is advantageously cooled to (obtain and) maintain a temperature of between about 50° C. and about 70° C., preferably of about 60° C., during the dry conching step.

In particular the chocolate mass is cooled throughout the dry conching step to (obtain and) maintain the dry conching temperature (or to keep the dry conching temperature more or less constant).

In a method of the invention the chocolate mass is advantageously heated to (obtain and) maintain a temperature of between about 60° C. and about 110° C., preferably of about 60° C. or about 90° C., during the wet conching step.

In particular the chocolate mass is heated throughout the wet conching step to (obtain and) maintain the wet conching temperature (or to keep the wet conching temperature more or less constant).

As mentioned above, cocoa butter, lecithin, or cocoa butter and lecithin is/are advantageously added after the dry conching step, yet before starting the wet conching step.

In an embodiment of the invention lecithin was added (just) before starting a wet (liquid) conching according to the invention (at a temperature between about 60° C. and about 110° C., between about 60° C. and about 90° C., more preferably either at about 60° C. or about 90° C.). Lecithin typically is added in a concentration of between 0.1% and 1%, more preferably in an amount between 0.4% and 0.6%, most preferably about 0.5 w/w % of lecithin is added (percentage on the total chocolate mass).

In another embodiment of the invention only cocoa butter was added (and no lecithin or any other emulsifier) to change the texture from dry to liquid. Cocoa butter herein replaced the emulsifier (in particular lecithin). It is well known in the art that 1 part of lecithin has the same effect on viscosity as about 10 to 20 parts, more in particular 15 parts of cocoa butter.

After conching the viscosity of the chocolate may be adjusted by adding fat and/or cocoa mass. Advantageously, the cocoa mass that is then added has undergone a heating step for a prolonged time at an elevated temperature, most preferably has undergone a heating step for about 12 hours at about 90° C.

Further provided is a method for conching dark chocolate, whereby a chocolate mass is submitted to a conching process as described above and wherein the wet conching step preferably lasts for at least 1 hour, preferably at least 3 hours, most preferably lasts for about 6 hours.

The dark chocolate mass is advantageously cooled throughout the dry conching step (to keep the dry conching temperature more or less constant).

The dark chocolate mass is advantageously heated throughout the wet conching step (to keep the dry conching temperature more or less constant).

Because the antioxidant activity advantageously is not decreasing during the conching process, the final antioxidant activity of the chocolate (at the end of the production process) will be higher than the antioxidant activity of a chocolate obtained by conventional conching methods.

A further aspect of the invention concerns a method for producing an (improved) chocolate. During the production process of the chocolate, a chocolate mass is hereby submitted to a conching process according to the invention and as described above. In particular, in a method of the invention different temperature conditions are applied for dry and wet (or liquid) conching as applied in the art. All other production steps such as mixing & grinding, refining, tempering, casting into moulds or further processing may be performed in a conventional way according to methods well known in the art.

In particular the present invention provides for a method for producing a dark chocolate, characterized in that during the production process a dark chocolate mass is submitted to a conching step as recited above (any of the above).

Another aspect of the invention concerns a chocolate or chocolate mass obtainable by any method as described above, wherein conching is performed according to the invention. In particular, the chocolate mass is a dark chocolate (mass).

As mentioned before, the (modified) conching process according to the invention conserves and/or increases the antioxidant activity of a chocolate or chocolate mass without (negatively) affecting its taste. The obtained chocolate is thus a healthier food product.

The invention also relates to any food product comprising (or consisting of) a chocolate thus obtainable or obtained.

SHORT DESCRIPTION OF THE FIGURES

FIG. 1 gives a view of the texture of a chocolate mass during dry conching.

Figure 2:
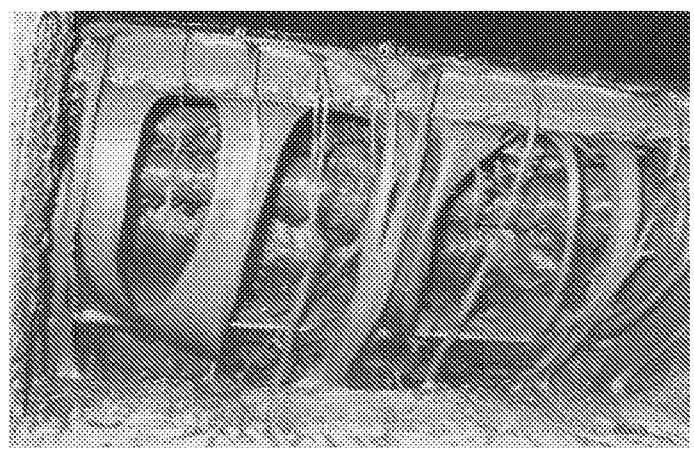

FIG. 2 gives a view of the fluid chocolate mass during wet conching, said mass being mechanically worked for a longer period.

Figure 3:
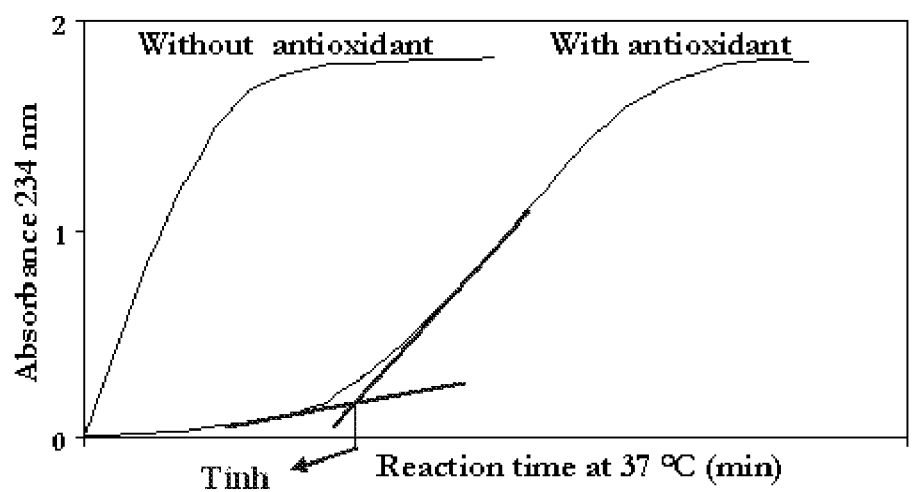

FIG. 3 shows how the inhibition time (Tinh) can be calculated from the abscissa of the intersection point of two straight lines that represent the slope at the beginning (inhibition phase) and the slope when the oxidation speed is maximal (propagation phase).

Figure 4:
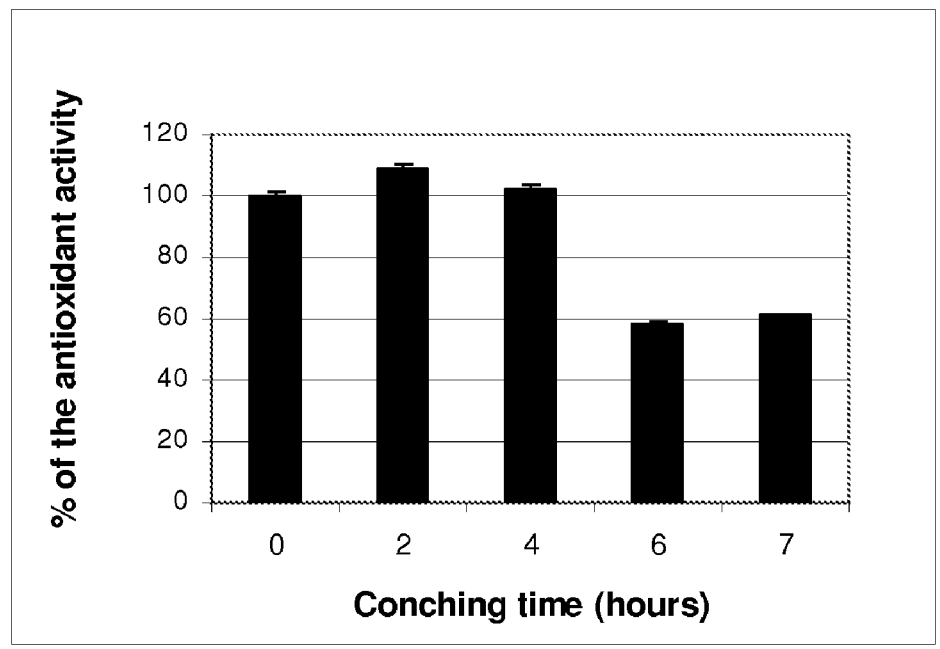

FIG. 4 shows the % of antioxidant activity of a chocolate extract in function of the conching time (hours), and this for a chocolate prepared by a traditional conching method. The antioxidant activity at t=0 was set at 100%. The data are the means of 2 replicates; standard deviations are indicated by error bars.

Figure 5:
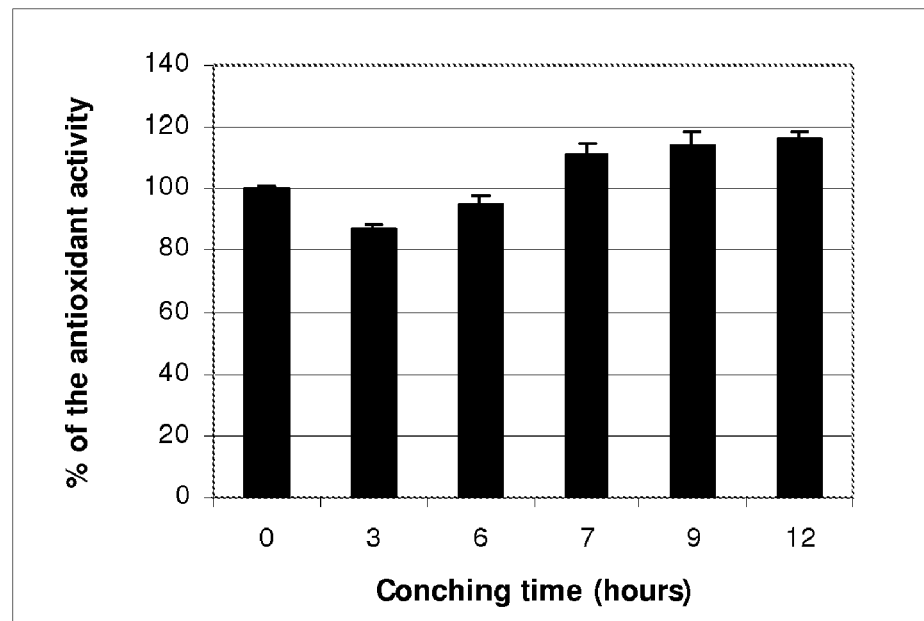

FIG. 5 shows the % of antioxidant activity of a chocolate extract in function of the conching time (hours), and this for a chocolate prepared by a method of the invention with a wet phase at 60° C. The antioxidant activity at t=0 was set at 100%. The data are the means of 2 replicates; standard deviations are indicated by error bars.

Figure 6:
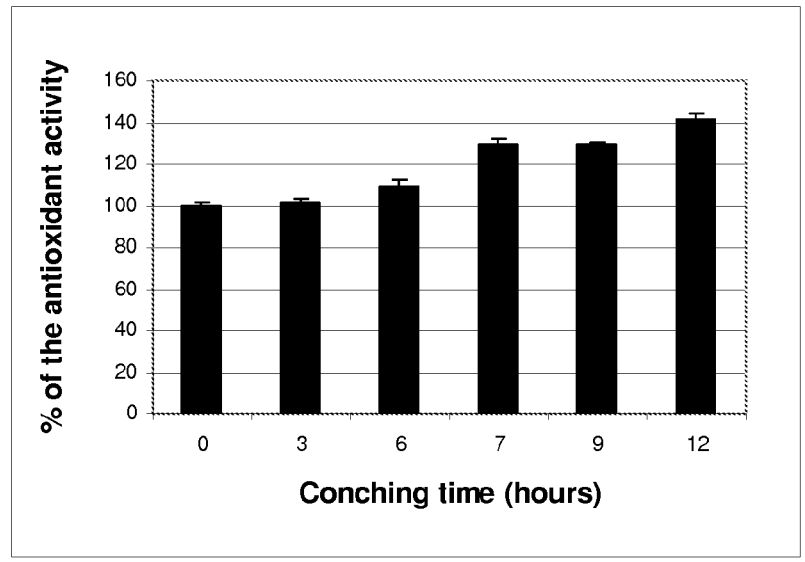

FIG. 6 shows the % of antioxidant activity of a chocolate extract in function of the conching time (hours), and this for a chocolate prepared by a method of the invention with a wet phase at 90° C. The antioxidant activity at t=0 was set at 100%. The data are the means of 2 replicates; standard deviations are indicated by error bars.

Figure 7:
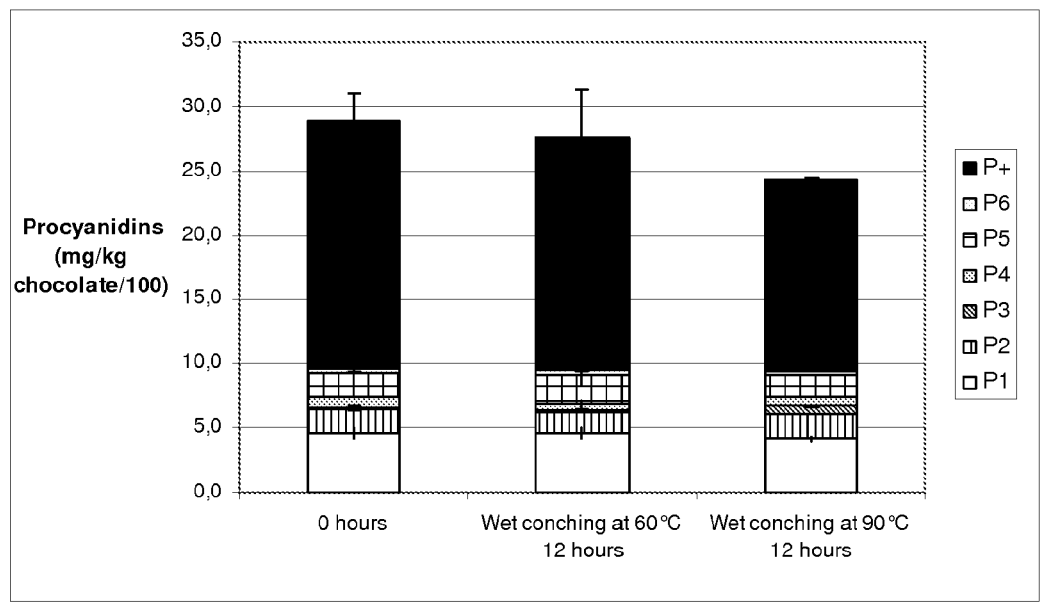

FIG. 7 shows the procyanidin content (in mg/kg chocolate/100) before conching (t=0) compared to the procyanidin content after a conching process according to the invention: dry conching for 6 hours at 60° C., followed by a wet conching step for another 6 hours at 60° C. (second bar) or at 90° C. (third bar), the total conching time thus being 12 hours.

Figure 8:
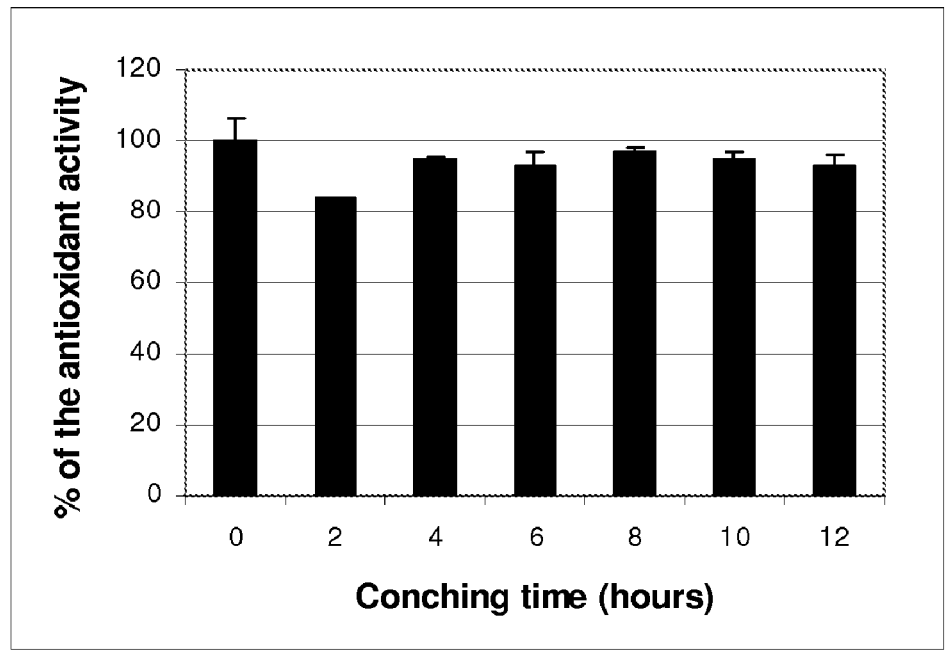

FIG. 8 shows the % of antioxidant activity of a chocolate extract in function of the conching time (hours), and this for a chocolate prepared by a single conching step consisting of a dry conching at 60° C. for 12 hours. The antioxidant activity at t=0 was set at 100%. The data are the means of 2 replicates; standard deviations are indicated by error bars.

Figure 9:
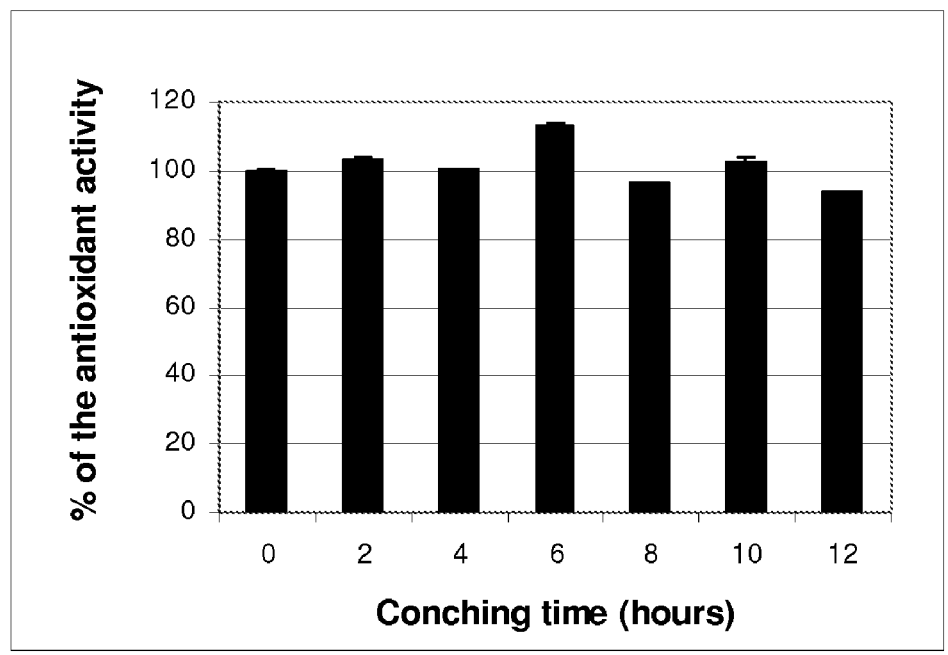

FIG. 9 shows the % of antioxidant activity of a chocolate extract in function of the conching time (hours), and this for a chocolate prepared by a single conching step consisting of a wet conching at 90° C. for 12 hours. The antioxidant activity at t=0 was set at 100%. The data are the means of 2 replicates; standard deviations are indicated by error bars.

Figure 10:
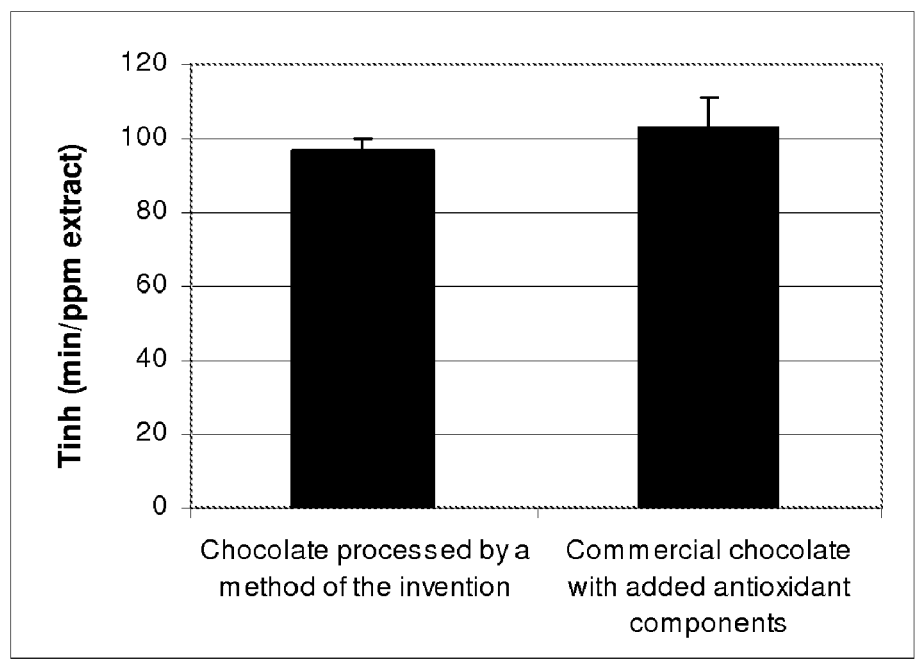

FIG. 10 compares the antioxidant activity of a chocolate prepared according to the invention with that of a commercial chocolate to which antioxidant components were added. The antioxidant activity is expressed as the inhibition time (Tinh) in minutes per ppm chocolate extract. The data are the means of 2 replicates; standard deviations are indicated by error bars.

Figure 11:
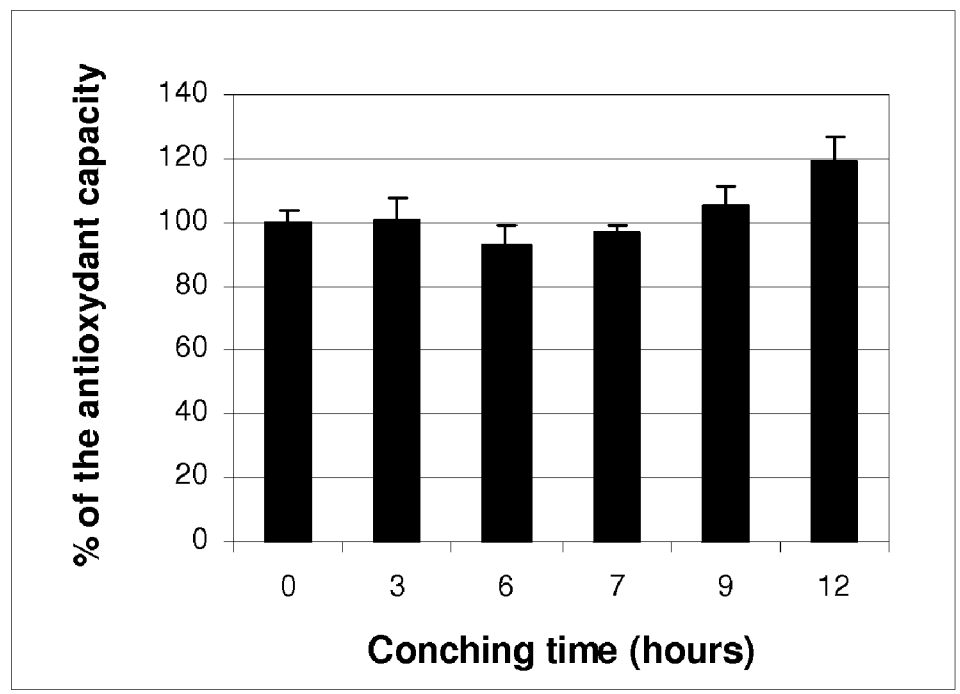

FIG. 11 shows the % of antioxidant activity of a chocolate extract in function of the conching time (hours), and this for a chocolate (type Madagascar) prepared by a method of the invention with a dry phase at 60° C. and a wet phase at 60° C. The antioxidant activity at t=0 was set at 100%. The data are the means of 2 replicates; standard deviations are indicated by error bars.

Figure 12:
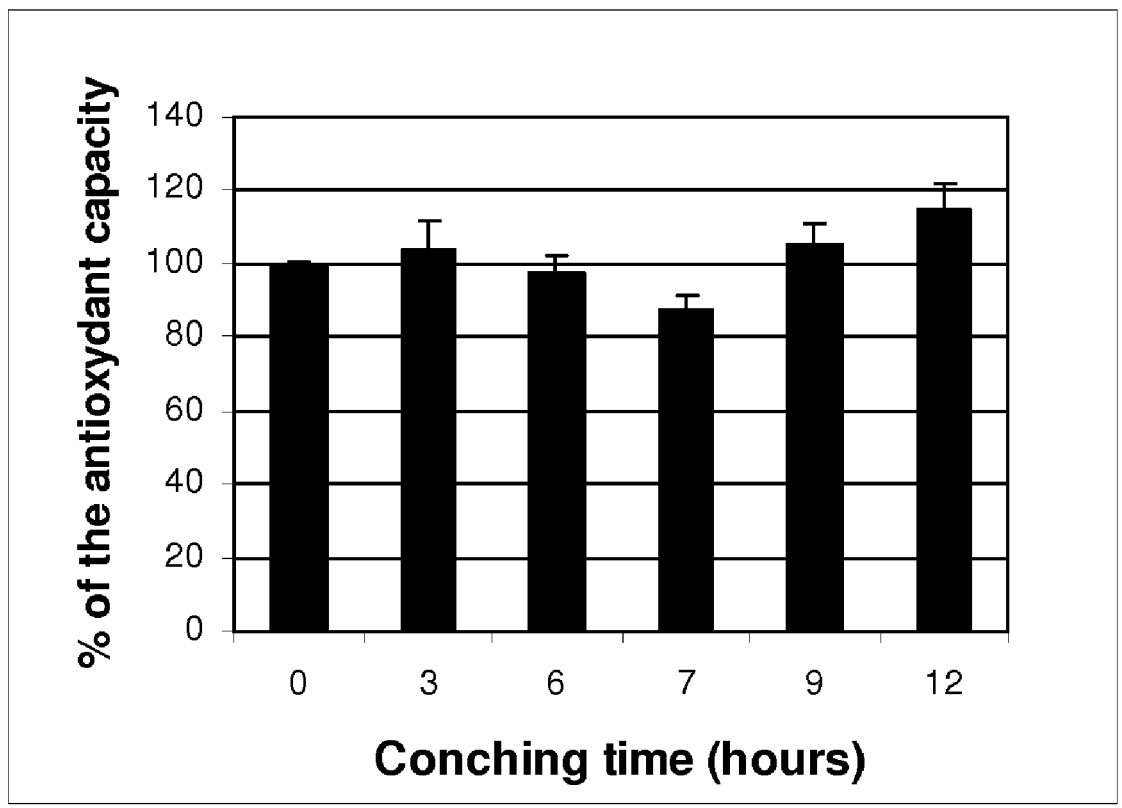

FIG. 12 shows the % of antioxidant activity of a chocolate extract in function of the conching time (hours), and this for a chocolate (type Madagascar) prepared by a method of the invention with a dry phase at 60° C. and a wet phase at 90° C. The antioxidant activity at t=0 was set at 100%. The data are the means of 2 replicates; standard deviations are indicated by error bars.

FIG. 13 shows the sand glass-type of correlation between dry and wet conching temperatures that lead to a conservation and advantageously an increase in antioxidant activity (expressed in % compared to t=0) during conching. Conching process: 6 hours dry conching, followed by 6 hours wet conching according to the invention.

DEFINITIONS AND DESCRIPTION

The present invention concerns a process to conserve and preferentially increase the antioxidant activity of chocolate by a using a new conching technique.

Throughout the invention the following definitions are used:

The term "chocolate" as used in the claims is used in a broader context and is meant to refer to chocolate types that contain cocoa solids such as dark chocolate, couverture chocolate, plain chocolate, milk chocolate, couverture milk chocolate and family milk chocolate. The names given here refer to common names and/or to names as used in the legislation (see e.g., the European directive 2000/36/EC). Preferred is a dark chocolate, for instance one prepared from a cocoa mass of the type Côte d'Ivoire or of the type Madagascar that is rich in flavanoids.

"Chocolate" (common name dark chocolate or plain chocolate) designates a product consisting of a mixture of cocoa products and sugars and/or sweeteners, preferably sugar, which contains not less than 35% total dry cocoa solids, including not less than 18% cocoa butter and not less than 14% of dry non-fat cocoa solids. Where this name ((dark) chocolate) is supplemented by the word "couverture", the product must contain not less than 35% total dry cocoa solids, including not less than 31% cocoa butter and not less than 2.5% of dry non-fat cocoa solids.

The term "milk chocolate" designates a product obtained from cocoa products, sugars and/or sweeteners, preferably sugar, and milk or milk products, which contains not less than 25% total dry cocoa solids; not less than 14% dry milk solids obtained by partly or wholly dehydrating whole milk, semi- or full-skimmed milk, cream, or from partly or wholly dehydrated cream, butter or milk fat; not less than 2.5% dry non-fat cocoa solids; not less than 3.5% milk fat; and not less than 25% total fat (cocoa butter and milk fat). Where this name (milk chocolate) is supplemented by the word "couverture" the product must have a minimum total fat (cocoa butter and milk fat) content of 31%.

The term "family milk chocolate" designates a product obtained from cocoa products, sugars and/or sweeteners, preferably sugar, and milk or milk products and which contains not less than 20% total dry solids; not less than 20% dry milk solids obtained by partly or wholly dehydrating whole milk, semi- or full-skimmed milk, cream, or from partly or wholly dehydrated cream, butter or milk fat; not less than 2.5% dry non-fat cocoa solids; not less than 5% milk fat; and not less than 25% total fat (cocoa butter and milk fat). Apart from this it is allowed to add optional ingredients like nuts, lecithin, whey powder, etc to any of the above types of chocolate.

The "antioxidant activity" is a measure for the protective effect of (antioxidant) molecules or compounds against free radicals. By reacting with the free radicals, antioxidant molecules minimize their damaging potential and make them harmless.

The "inhibition time" (Tinh) is a measure for the antioxidant activity of the chocolate (extract). The longer the inhibition time the higher the antioxidant activity. The inhibition time can be derived from the abscissa of the intersection point of two straight lines that represent the slope at the beginning (inhibition phase) and the slope when the oxidation speed is maximal (propagation phase) (FIG. 3).

In the present invention the antioxidant activity is most often expressed in percentages, whereby the antioxidant activity of the chocolate mass before conching (t=0) is put at 100%. As such, an increase/decrease in antioxidant activity can be determined/measured for any type of chocolate.

The term "conching" refers to a process typically associated to the production of chocolate. It is a prolonged mechanical mixing of the mass combined to a heating. Conching is carried out in special vessels called "conches", well known in the art. Optional ingredients like cocoa butter and flavours are generally added at this stage. Lecithin is also frequently added as an emulsifier. Other emulsifiers may also be used like for example polyglycerol polyricinoleate and ammonium phosphatide.

"Dry conching" is known as a type of conching process that is carried out for a relatively short time, e.g. for a few hours up to about 20 hours, at high temperatures, mostly above 70° C. and usually about 90° C. for dark chocolate. For other types of chocolate the temperatures may slightly vary.

The chocolate is herein kept at a low fat content, generally between 25% and 30% (w/w percentage on the chocolate mass submitted to dry conching), depending on the ingredients and/or type of machinery used.

The purpose of "dry conching" is to generate a dry texture in order to increase the energy input by producing high shear forces, and finally to increase the temperature of the chocolate mass (FIG. 1).

"Wet conching" is known as a type of conching process that is carried out at a relatively low temperature, usually around 60° C. All the cocoa butter and the other ingredients such as lecithin are added early in the process preferably within the first two hours.

The purpose of this treatment ("wet conching") with relatively low energy input is to maintain the fluidity of the mass which is then mechanically worked for a prolonged time, e.g. 12 or 30 hours or more (FIG. 2).

The above definitions relate to (conventional) dry and wet conching steps as they are generally applied in the art.

The present invention relates to an adapted conching process wherein a wet conching step follows dry conching. Preferred temperature conditions and the like are documented throughout the application.

As further documented below, in the present invention most often cooling is applied during the step of "dry conching", and heating during the "wet conching" step, as thereby the antioxidant activity could be (further) increased.

In that respect the actually applied "dry" and "wet" conching steps thus differ from the conventional "dry" and "wet" conching steps applied in the field (and for which definitions are given).

DETAILED DESCRIPTION

Chocolate must undergo a conching process if one wants to produce a (quality) chocolate with the desired rheological properties and flavour.

The present invention relates in particular to this conching process and modifications thereto.

When submitting a chocolate mass to a conventional conching process, the antioxidant activity decreases after conching. In particular, the antioxidant activity decreases during a conching process as used in the art.

The present invention relates to the changes the inventors made to the conventional conching process with the aim of avoiding this decrease in antioxidant activity.

To their surprise, the inventors discovered that the antioxidant activity of chocolate was not only conserved, but most often increased with their method.

The examples below show that by using a conching process according to the invention, the antioxidant level of the chocolate can be significantly improved.

The newly developed conching process consists of two successive phases or steps:

In the first phase, the so called "dry conching step", the chocolate with a low fat content (typically between 25 and 30%) is subjected to an intense kneading at elevated temperatures.

Temperatures applied during the dry conching step in the method of the invention may vary from about 50° C. to about 70° C., and the duration of this dry conching step may vary from a few hours (about 1 to 2 hours) up to about 12 hours. Preferably, dry conching according to the invention takes place at about 55° C. to about 65° C. and lasts for about 6 to about 10 to 12 hours. Most preferably the dry conching step lasts for about 6 hours at about 60° C.

Advantageously, in a method of the invention the chocolate mass is cooled to maintain these temperatures. If not, the temperature may rise up to e.g. 90° C. because of friction heat generated during the dry conching step.

(Immediately) after the dry conching step, and before the wet conching step, an emulsifier and/or some fat is advantageously added. Typical emulsifiers are lecithin, polyglycerol polyricinoleate, ammonium phosphatide or any mixture of these. Typical fats are cocoa butter, milk fat and/or some allowed vegetable fats. Preferred emulsifiers/fats are traditionally lecithin and/or cocoa butter. In an embodiment of the invention cocoa butter was added. In an even more preferred embodiment of the invention lecithin was added.

In the method of the invention, a "wet conching step" (immediately) follows, is subsequent to, the dry conching step. The wet conching step of the invention may last from a few hours (1 to 2 hours) up to about 12 hours with temperatures in the range of about 60 till about 110° C. Preferably "wet conching" according to the invention is performed at about 60° C. to about 105° C., at about 65° C. to about 100° C., and lasts for about 6 to about 10 to 12 hours. Most preferably the wet conching step of the invention lasts for about 6 hours at about 90° C. However, also at 60° C. an increase in antioxidant activity could be observed. According to another preferred embodiment, the wet conching step of the invention therefore lasts for about 6 hours at 60° C.

Advantageously, the chocolate mass is heated to maintain these temperatures. As mentioned above, conventional wet conching steps are performed at temperatures of about 40° C. to about 60° C.

After conching, the chocolate viscosity can still be adjusted by adding fat and/or cocoa mass in the conche itself or in any mixing unit.

When cocoa mass is added, it has preferably undergone a heating step for a prolonged time at an elevated temperature, most preferably it has undergone a heating step for about 12 hours at about 90° C.

Using the particular combinations of conching process steps as described above, a level of about 20% above the typical antioxidant activity can be obtained (FIGS. 5 and 11). Even a level of about 40% above the typical antioxidant activity can be obtained with a method of the invention (FIG. 6). The typical antioxidant activity is hereby the antioxidant activity just before conching (t=0).

Excellent results were obtained with a dark chocolate (increases of up to 40%). A method of the invention can also be used for milk chocolate, in particular when a dry conching at 60° C. is followed by a wet conching at 90° C. In said case an increase in antioxidant activity of about 7% was noted at the end of the conching process compared to t=0.

As demonstrated below (see the Examples), the typical combination of low and high temperatures, specifically linked to the respective textures of the product during the two phases of the conching process ("dry" and "wet" conching), results in the formation of highly antioxidative compounds (e.g. antioxidative polymers) in the chocolate.

As further demonstrated, the method of the invention results in a higher effectively measured antioxidant activity.

Where the traditional processes cause a degradation of the antioxidant components, the processes described in the present invention "naturally" increase the antioxidant activity of the chocolate. By "naturally" is meant that in order to conserve and/or increase the antioxidant activity, no antioxidative molecules need to be added (as additive) to the chocolate mass.

Where adapted (manufacturing) processes previously described only claim to preserve the amount of antioxidant components, the process of the present invention boosts (increases) the antioxidant activity.

As shown the level of "beneficial" antioxidants can be (further) improved by using a wet conching step at a higher temperature (preferred temperature ranges for methods of the invention given above). Preferably, this temperature in a method according to the invention lies around 90° C. At this temperature the increase in antioxidant activity was the highest, yet also a wet conching step at (about) 60° C. proved beneficial.

The inventors observed that a (chocolate) composition which was submitted to a method of the invention, with a "wet conching" at about 60° C. (preceded by a "dry" conching at 60° C.)) did not undergo any significant changes in procyanidin content, and not even in the repartition of the procyanidins in small oligomers (P2-P6) and in polymers (P+). However, the antioxidant activity was increased with about 20% (compared to the activity just before ("dry") conching, t=0).

The composition which was submitted to a "wet" conching at 90° C. (preceded by a "dry" conching at 60° C.) contains significantly less procyanidin polymers (P+) whereas the antioxidant activity increased with about 40% (compared to the activity just before ("dry") conching, t=0).

Although in the literature it is reported that the antioxidant activity of procyanidin oligomers was found to increase significantly with the degree of polymerisation, in both compositions the antioxidant activity of the chocolate was significantly increased with an equal or lower procyanidin polymer content.

It therefore appears that part(s) of the chocolate extract that remain(s) unidentified contributes greatly to the antioxidant activity. The method of the invention most probably also extracts melanoidins and perhaps higher-order tannins (Counet, C. & Collin, S., 2003).

A process temperature of about 90° C. is ideal to promote the development of these melanoidins and tannins. This may explain the higher increase in antioxidant activity at (about) 90° C. during the "wet" conching phase of the method of the invention.

The data below demonstrate that a high natural antioxidant activity of antioxidants in chocolate can be obtained, without the "addition" of any antioxidant molecules.

The invention will be described in further details in the following examples by reference to the enclosed drawings, which are not in any way intended to limit the scope of the invention as claimed.

EXAMPLES

Example 1

Chocolate Produced by a Traditional Conching Process

A chocolate was prepared comprising:

| | |
|---|---|
| Sugar | 48.20% |
| Cocoa mass (Côte d'Ivoire) | 38.90% |
| Cocoa butter | 12.30% |
| Lecithin | 0.60% |

% (w/w) on the final chocolate mass

The chocolate was produced with the following steps:

Mixing: in this step all the sugar, cocoa mass and part of the cocoa butter (48.8% of the cocoa butter) were mixed together.

Refining: the chocolate paste was refined on a three roll refiner with a grinding length of the rolls of 280 mm×600 mm. The fineness of the powder was between 15 and 20 µm.

Filling: the conche was slowly filled with chocolate powder over a time period of 70 minutes. Immediately after this period another 3.3% of the cocoa butter amount was added.

Conching: the chocolate was dry-conched for 6 h at 90° C. in a Frisse conche. Lecithin and the rest of the cocoa butter were added immediately after the dry conching step. The liquid step, following the conching step at dry texture, was operated for one hour at 60° C.

The antioxidant activity was measured by measuring the protective degree of the chocolate extract against a forced oxidation of linoleic acid according to a method described by Liégois, C. et al. (2000). For the extraction protocol, see example 2.

The oxidation of linoleic acid was induced by 2,2'-azobis (2-amidinopropane)dihydrochlorure (AAPH) in an aqueous dispersion in the absence or presence of antioxidant (chocolate extract). AAPH generates free radicals by spontaneous thermal decomposition.

The rate of oxidation at 37° C. was monitored by recording the increase in absorption at 234 nm caused by conjugated diene hydroperoxides.

From these data the inhibition time of the oxidative reaction of linoleic acid can be calculated (FIG. 3) which is a measure for the antioxidant activity. The longer the inhibition time (Tinh), the higher the antioxidant activity.

The antioxidant activity was evaluated at various intervals during the process and finally expressed in the form of a percentage of the antioxidant activity at the beginning of the conching (point at 0 hours), as this allows to compare the effect of different conching processes for different chocolates. The antioxidant activity in this case corresponds to the following: $[Tinh_{(t=x)}/Tinh_{(t=0)}]*100$.

FIG. 4 clearly shows that after 6 hours the antioxidant activity decreases round and about 40% (compared to the initial value at t=0) in a chocolate produced by a traditional conching process.

Example 2

Preparation of Chocolate with Increased Antioxidant Activity

Two chocolates were prepared as described in example 1 with the exception that the conching process includes first a dry conching step at 60° C. instead of 90° C. and secondly, after the addition of only the lecithin, a wet conching step either at 60° C. (for the first chocolate) or at 90° C. (for the second chocolate). Each conching step ("dry" and "wet") lasted for about 6 hours. The remaining part of the cocoa butter was added after conching.

The antioxidant activity was once more evaluated at various intervals during the conching process. Results are presented in FIGS. 5 & 6. In both cases the antioxidant activity (at the end of the conching process) is increased, with about 20% at 60° C. and about 40% at 90° C. (compared to the start point at t=0). Dry conching lasted for 6 hours and was followed by a wet conching according to the invention. After 1 hour of wet (or liquid) conching there was already an increase in oxidant activity (compared to the start point). Said increase was most pronounced if the wet conching step also lasted for about 6 hours.

The procyanidin content has been evaluated in both chocolates by NP-HPLC-UV. Briefly, the chocolate was transformed in powder with a mixer and introduced into a Soxhlet filtration cartridge to remove the lipids.

The defatted chocolate (1 g) was then extracted two times with 5 ml of solvent (2×10 min, 25° C. to avoid any thermal degradation of procyanidins). Three organic solvents are frequently used for procyanidin extraction mixed with water and acetic acid: acetone, ethanol or methanol (e.g. acetone/water/acetic acid: 70/28/2% (v/v)).

After each extraction, the suspension was centrifuged (3000 g, 10 min). The combined supernatants were concentrated by rotary evaporation under partial vacuum (40° C.)

Ten milligrams of procyanidin extract were then diluted in 1 ml of methanol and finally 20 µl of this solution was injected in a NP-HPLC (normal phase-HPLC). Procyanidins were separated on a Phenomenex 5 µm normal-phase Luna silica column, 250 mm×4.6 mm (inside diameter) (Bester) at 25° C.

Separations were carried out at a flow rate of 1 mL/min with a linear gradient from A (dichloromethane) to B (methanol) and a constant level of C (acetic acid and water, 1:1, v/v).

The NP-HPLC was coupled to a UV detector (280 nm) in order to determine the concentration of the different procyanidins present in the extract according to the method of Counet, C. & Collin, S. (2003).

In FIG. 7, the repartition profile of the procyanidins is shown with P1 to P6 being the monomers to hexamers and P+ being the polymers.

This graph shows that the composition which was submitted to a wet conching at 60° C. did not undergo any significant changes in procyanidin content, and not even in the repartition of the procyanidins in monomers (P1), in small oligomers (P2-P6) and in polymers (P+).

The composition which was submitted to a wet conching at 90° C. clearly contains significantly less procyanidin polymers (P+).

Example 3

Chocolate Preparation with a Single Conching Step

Two chocolates were prepared as described in Example 2.

The first chocolate was conched by applying only a dry conching phase. Only step 1 of the method of the invention was thus performed. The dry conching step lasted for 12 hours and was performed at 60° C. The fat content was 29% (w/w % on the chocolate mass submitted to dry conching) and no emulsifier was added.

The second chocolate was conched by applying only a wet conching phase. Only step 2 of the method of the invention was thus performed. The wet conching step lasted for 12 hours and was performed at 90° C. The chocolate contained 0.5% w/w of lecithin as emulsifier (percentage on the total chocolate mass).

Results are shown in FIGS. 8 & 9 respectively.

In both cases, the antioxidant activity remained more or less stable during the conching process. There is no (consistent) decrease or increase of the antioxidant activity over the whole period of the conching process.

The data presented here—when compared with those of FIG. 6—show that it is the combination of the 2 types of conching (a dry conching followed by a wet conching according to the invention) that results in an increase in antioxidant activity.

Example 4

Comparison with a Commercial Sample Claiming a High Antioxidant Sample

In the present example, the antioxidant activity of a commercial sample ("New Tree, Chocolat Noir, Eternity") claiming a high antioxidant content in polyphenols was compared with that of a chocolate prepared by a method of the invention (see Example 2).

The chocolate prepared according to a method of the invention was submitted to a dry conching step at 60° C. (step 1), followed by a wet conching step at 90° C. (step 2).

The antioxidant activity of each sample was measured as described in example 1. Results, calculated for the same amount of non-fat dry cocoa content, are presented in FIG. 10 and are expressed as the inhibition time of the oxidative reaction of linoleic acid.

The process according to the present invention produced a chocolate having an antioxidant activity equivalent to that of the commercial chocolate claiming to have an increased content in antioxidant components.

The commercial sample is an example of a chocolate to which antioxidant components are added. By following a method of the invention an increased antioxidant activity can be obtained through a simple adaptation of the conching process. No antioxidants need to be added during (at the end of) the production process to achieve this effect. This is what is meant when saying that the antioxidant activity is conserved and preferentially increased in a "natural way".

Advantageously the taste (and other properties) of chocolate is not influenced by the adapted production process (conching process) according to the invention.

Example 5

Dark Chocolate Prepared with Cocoa Mass from Madagascar

Two chocolates were prepared as described in example 2 with the exception that a cocoa mass of the type Madagascar was used instead of one of the type Côte d'Ivoire.

More particularly, a chocolate was prepared comprising:

| | |
|---|---|
| Sugar | 48.20% |
| Cocoa mass (Madagascar) | 38.90% |
| Cocoa butter | 12.30% |
| Lecithin | 0.60% |

% (w/w) on the final chocolate mass

The chocolate was conched according to a method of the invention. The conching process includes first a dry conching step at 60° C. and secondly, after the addition of lecithin, a wet conching step either at 60° C. (for the first chocolate) or at 90° C. (for the second chocolate). Each conching step ("dry" and "wet") lasted for about 6 hours.

The antioxidant activity was once more evaluated at various intervals during the conching process. Results are presented in FIGS. 11 & 12. In the case of a wet conching at 60° C. the antioxidant activity at the end of the conching period was about 20% higher than at t=0. In the case of a wet conching at 90° C. an increase of about 15% was noted.

Example 6

Addition of Cocoa Butter Instead of Lecithin

A dark chocolate was prepared comprising:

| | |
|---|---|
| Sugar | 44.46% |
| Cocoa mass (Côte d'Ivoire) | 35.89% |
| Cocoa butter | 19.65% |

% (w/w) on the final chocolate mass

The way of preparing is in fact as indicated in Example 2, except that instead of lecithin there was an addition of cocoa butter after 6 hours of conching (before starting wet conching). The texture (fluidity) of the mass submitted to wet conching is comparable to that of Example 2.

Briefly, the chocolate was produced according to the following steps:

Mixing: in this step all the sugar, cocoa mass and part of the cocoa butter (28.2% of the cocoa butter) were mixed together.

Refining: the chocolate paste was refined on a three roll refiner with a grinding length of the rolls of 280 mm×600 mm. The fineness of the powder was between 15 and 20 µm.

Filling: the conche was slowly filled with chocolate powder over a time period of 70 minutes. Immediately after this period another 1.9% of the cocoa butter amount was added.

Conching: the chocolate was dry-conched for 6 h at 60° C. in a Frisse conche. 42.3% of the cocoa butter was added immediately after the dry conching step (or the conching step at dry texture). The liquid phase (wet conching) was operated for 6 h at 90° C.

The remaining part of the cocoa butter was added after conching.

At t=12 the antioxidant activity was increased by about 7% compared to the antioxidant activity at t=0.

Example 7

Conching Conditions for a Dark Chocolate

In the table below some examples are given of antioxidant activity for dry and wet conching temperature combinations applied in a method of the invention. Suitable temperatures (° C.) for dry and wet conching: results in bold italic. Preferred combinations for dry and wet conching: results in bold. For the chocolate recipe, see Example 1. Values of antioxidant activity (%) are those after 12 hours: 6 hours dry conching followed by 6 hours wet conching, see Example 2. The value at t=0 was set at 100% (value at the start of conching).

Similar results were obtained for other dark chocolates. Best results were obtained when a dry conching step at a temperature between about 50° C. and about 70° C., more preferably between about 55° C. and about 65° C., was followed by a wet conching step near 60° C. or near 90° C.

TABLE

Antioxidant activity (% compared to t = 0) for dry and wet conching temperature combinations applied in a method of the invention

| | | Dry conching | | | | | | | | | | |
|---|---|---|---|---|---|---|---|---|---|---|---|---|
| | | 50 | 52 | 54 | 56 | 58 | 60 | 62 | 64 | 66 | 68 | 70 |
| Wet conching | 60 | 81 | 93 | 103 | 111 | 116 | 119 | 119 | 118 | 114 | 107 | *98* |
| | 63 | 73 | 85 | *95* | 102 | 107 | 109 | 110 | 108 | 103 | *97* | 87 |
| | 66 | 68 | 79 | 89 | *96* | 100 | 103 | 102 | 100 | *95* | 88 | 79 |
| | 69 | 64 | 76 | 85 | 92 | *96* | *98* | *98* | *95* | 90 | 83 | 73 |
| | 72 | 64 | 75 | 84 | 90 | 94 | *96* | *95* | 92 | 87 | 79 | 69 |
| | 75 | 65 | 76 | 85 | 91 | 94 | *96* | *95* | 92 | 86 | 78 | 68 |
| | 78 | 69 | 80 | 88 | 94 | *97* | *98* | *97* | 94 | 88 | 79 | 69 |
| | 81 | 76 | 86 | 94 | *99* | 102 | 103 | 102 | *98* | 92 | 83 | 72 |
| | 84 | 85 | 94 | 102 | 107 | 110 | 111 | 109 | 105 | *98* | 89 | 78 |
| | 87 | *96* | 105 | 113 | 117 | 120 | 120 | 118 | 114 | 107 | 98 | 86 |
| | 90 | 109 | 118 | 125 | 130 | 132 | 132 | 130 | 125 | 118 | 109 | *97* |

REFERENCES

Beckett, S. T. Industrial chocolate manufacture and use. Second edition. Blackie Academic & Professional. 1994:118-121.

Ziegleder, G. Conching. Information on the britanniafood web site, accessible via http://www.britanniafood.com/download/?mode=dynamic&id=21, July 2006.

Van Sant, G. Vrije radicalen en antioxidanten: basisprincipes. Symposium—antioxidanten en voeding—Instituut Danone. 2004.

Information on 'Free radicals' on the wikipedia web site, accessible via http://www.wikipedia.org/wiki/Free radicals, July 2006.

Roura, E.; Andrés-Lacueva, C.; Jauregui, O.; Badia, E.; Estruch, R.; Izquierdo-Pulido, M.; Lamuela-Raventos, R. M. Rapid liquid chromatography tandem mass spectrometry assay to quantify plasma (−)-Epicatechin metabolites after ingestion of a standard portion of cocoa beverage in humans. J. Agric Food Chem. 2005, 53: 6190-6194.

Mursu, J.; Voutilainen, S.; Nurmi, T.; Rissanen, T. H.; Virtanen, J. K.; Kaikkonen, J.; Nyyssönen, K.; Salonen, J. Dark chocolate consumption increases HDL cholesterol concentration and chocolate fatty acids may inhibit lipid peroxidation in healthy humans. Free Radical Biology & Medicine, 2004, Vol 37, No. 9: 1351-1359.

Lee, K. W.; Kim, Y. J.; Lee, H. J.; Lee, C. Y. Cocoa has more phenolic phytochemicals and a higher antioxidant capacity than teas and red wine. J. Agric. Food Chem., 2003, 51: 792-7295.

USDA (US Department of Agriculture)-Mc Bride, J. High-ORAC foods may slow aging. 1999, 47: 15-17.

Counet, C.; Collin, S. Effect of the number of flavanol units on the antioxidant activity of procyanidin fractions isolated from chocolate. J. Agric. Food Chem. 2003, 51: 6816-6822.

Wan, Y.; Vinson, J. A.; Etherton, T. D.; Proch, J.; Lazarus, S. A.; Kris-Etherton, P. M. Effects of Cocoa Powder and Dark Chocolate in LDL Oxidative Susceptibility and Prostaglandin Concentrations in Humans. American Journal of Clinical Nutrition, 2001, Vol. 74, No. 5: 596-602.

Kondo, K.; Hirano, R.; Matsumoto, A., Igarashi, O.; Itakura, H. Inhibition of LDL oxidation by cocoa. Lancet, 1996, 348: 1514.

Waterhouse, A. L.; Shirley, J. R.; Donovan, J. L. Antioxidants in chocolate. Lancet, 1996, 348: 834.

Sanbongi, C.; Suzuki, N.; Sakane, T. Polyphenols in chocolate, which have antioxidant activity, modulate immune functions in humans in vitro. Cell Immunol, 1997, 177(2): 129-36.

Engler, M. B.; Engler, M. M.; Chen, C. Y.; Malloy, M. J.; Browne, A.; Chiu, E. Y.; Kwak, H. K.; Milbury, p.; Paul, S. M.; Blumber, J.; Mietus-Snyder, M. L. Flavonoid-rich dark chocolate improves endothelial function and increases plasma epicatechin concentrations in healthy adults. J. am. Coll. Nutr, 2004, 23: 197-204.

Hemann, F.; Spieker, L. E.; Ruschitzka, R.; Sudano, I.; Hermann, M; Binggeli, C.; Luscher, T. F.; Riesen, W.; Noll, G.; Corti, R. Dark chocolate improves endothelial and platelet function. Heart, 2006, 166: 411-417.

Grassi, D.; Lippi, C.; Necozione, S.; Desideri, G. Ferri, C. Short-term administration of dark chocolate is followed by a significant increase in insulin sensitivity and a decrease in blood pressure in healthy persons. Am. J. Clin. Nutr. 2005, 81: 611-614.

Buijsse, B.; Feskens, E. J. M.; Kok, F. J.; Kromhout, D. Cocoa intake, blood pressure, and cardiovascular mortality. Arch. Intern. Med., 2006, 166: 411-417.

Liégeois, C.; Lermusieau, G.; Collin, S. Measuring antioxidant efficiency of wort, malt and hops against the 2,2'-azobist(2-amidinopropane)dihydrochloride-induced oxidation of an aqueous dispersion of linoleic acid. J. Agric. Food Chem., 2000, 48: 1129-1134.

The invention claimed is:

1. A method of conserving and/or increasing the antioxidant activity of a dark chocolate mass during conching, said method comprising the step of submitting a dark chocolate mass to a conching process comprising the successive steps of:
   performing a dry conching step at a temperature of between about 50° C. and about 70° C.; and
   performing a wet conching step at a temperature of between about 60° C. and about 110° C.,
   wherein the level of antioxidant activity after the wet conching step is greater than or equal to the level of antioxidant activity at the beginning of the dry conching step,
   and wherein the dry conching step lasts for at least 4 hours.

2. The method of claim 1, wherein the temperatures for dry and wet conching are selected from the group consisting of (A) about 50-69° C. for dry conching and about 88-90° C. for wet conching, (B) about 50-68° C. for dry conching and about 87-88° C. for wet conching, (C) about 51-67° C. for dry conching and about 86-87° C. for wet conching, (D) about 52-67° C. for dry conching and about 85-86° C. for wet conching, (E) about 53-66° C. for dry conching and about 83-85° C. for wet conching, (F) about 54-65° C. for dry conching and about 82-83° C. for wet conching, (G) about 55-65° C. for dry conching and about 81-82° C. for wet conching, (H) about 56-64° C. for dry conching and about 80-81° C. for wet conching, (I) about 56-63° C. for dry conching and about 79-80° C. for wet conching, (J) about 57-63° C. for dry conching and about 78-79° C. for wet conching, (K) about 58-62° C. for dry conching and about 76-78° C. for wet conching, (L) about 59-61° C. for dry conching and about 73-76° C. for wet conching, (M) about 60-61° C. for dry conching and about 71-73° C. for wet conching, (N) about 59-62° C. for dry conching and about 70-71° C. for wet conching, (O) about 58-63° C. for dry conching and about 68-70° C. for wet conching, (P) about 57-64° C. for dry conching and about 67-68° C. for wet conching, (Q) about 57-65° C. for dry conching and about 66-67° C. for wet conching, (R) about 56-66° C. for dry conching and about 64-66° C. for wet conching, (S) about 55-67° C. for dry conching and about 63-64° C. for wet conching, (T) about 55-68° C. for dry conching and about 62-63° C. for wet conching, (U) about 54-69° C. for dry conching and about 61-62° C. for wet conching, and (V) about 53-69° C. for dry conching and about 60-61° C. for wet conching.

3. The method of claim 1, wherein the temperatures for dry and wet conching are selected from the group consisting of (A) about 50-68° C. for dry conching and about 88-90° C. for wet conching, (B) about 51-67° C. for dry conching and about 87-88° C. for wet conching, (C) about 52-66° C. for dry conching and about 86-87° C. for wet conching, (D) about 53-66° C. for dry conching and about 85-86° C. for wet conching, (E) about 54-65° C. for dry conching and about 84-85° C. for wet conching, (F) about 55-64° C. for dry conching and about 83-84° C. for wet conching, (G) about 56-63° C. for dry conching and about 82-83° C. for wet conching, (H) about 57-62° C. for dry conching and about 81-82° C. for wet conching, (I) about 58-62° C. for dry conching and about 80-81° C. for wet conching, (J) about 60-62° C. for dry conching and about 66-67° C. for wet conching, (K) about 58-64° C. for dry conching and about 65-66° C. for wet conching, (L) about 57-65° C. for dry conching and about 64-65° C. for wet conching, (M) about 57-66° C. for dry conching and about 63-64° C. for wet conching, (N) about 56-67° C. for dry conching and about 62-63° C. for wet conching, (O) about 55-68° C. for dry conching and about 61-62° C. for wet conching, and (P) about 54-68° C. for dry conching and about 60-61° C. for wet conching.

4. The method of claim 1, wherein the temperatures for dry and wet conching are selected from the group consisting of (A) about 56-67° C. for dry conching and about 60-61° C. for wet conching, (B) about 57-66° C. for dry conching and about 61-62° C. for wet conching, (C) about 58-65° C. for dry conching and about 62-63° C. for wet conching, (D) about 59-64° C. for dry conching and about 63-64° C. for wet conching, (E) about 60-62° C. for dry conching and about 64-65° C. for wet conching, (F) about 50-68° C. for dry conching and about 89-90° C. for wet conching, (G) about 51-67° C. for dry conching and about 88-89° C. for wet conching, (H) about 52-66° C. for dry conching and about 87-88° C. for wet conching, (I) about 53-65° C. for dry conching and about 86-87° C. for wet conching, (J) about 54-64° C. for dry conching and about 85-86° C. for wet conching, (K) about 56-63° C. for dry conching and about 84-85° C. for wet conching, (L) about 57-62° C. for dry conching and about 83-84° C. for wet conching, and (M) about 58-61° C. for dry conching and about 82-83° C. for wet conching.

5. The method of claim 1, wherein the temperatures for dry and wet conching are selected from the group consisting of (A) about 57-66° C. for dry conching and about 60-61° C. for wet conching, (B) about 59-64° C. for dry conching and about 61-62° C. for wet conching, (C) about 52-66° C. for dry conching and about 89-90° C. for wet conching, (D) about 53-66° C. for dry conching and about 88-89° C. for wet conching, (E) about 54-65° C. for dry conching and about 87-88° C. for wet conching, (F) about 55-64° C. for dry conching and about 86-87° C. for wet conching, (G) about 56-62° C. for dry conching and about 85-86° C. for wet conching, and (H) about 58-61° C. for dry conching and about 84-85° C. for wet conching.

6. The method of claim 1, wherein the temperatures for dry and wet conching are selected from the group consisting of (A) about 60-63° C. for dry conching and about 60-61° C. for wet conching, (B) about 53-65° C. for dry conching and about 89-90° C. for wet conching, (C) about 54-64° C. for dry conching and about 88-89° C. for wet conching, (D) about 55-63° C. for dry conching and about 87-88° C. for wet conching, and (E) about 57-61° C. for dry conching and about 86-87° C. for wet conching.

7. The method of claim 1, wherein the dry conching step is performed at a temperature between about 50° C. and about 70° C., and the wet conching step is performed at about 60° C.

8. The method of claim 1, wherein dry conching is performed at about 60° C. and wet conching at about 60° C.

9. The method of claim 1, wherein the dry conching step is performed at a temperature between about 50° C. and about 70° C., and the wet conching step is performed at about 90° C.

10. The method of claim 9, wherein the dry conching step is performed at a temperature between about 55° C. and about 65° C., and the wet conching step is performed at a temperature between 84° C. and 90° C.

11. The method of claim 1, wherein dry conching is performed at about 60° C. and wet conching at about 90° C.

12. The method of claim 1, wherein the dry conching step is performed at a temperature between about 55° C. and about 65° C., and the wet conching step at a temperature between about 81° C. and about 90° C.

13. The method of claim 12, wherein the wet conching step is performed at a temperature between about 84° C. and about 90° C.

14. The method of claim 1, wherein the dry conching step is performed at a temperature between about 55° C. and about 65° C., and the wet conching step at a temperature between about 60° C. and about 63° C.

15. The method of claim 1, wherein the wet conching step lasts for about 1 to about 12 hours.

16. The method of claim 15, wherein the dry and wet conching step lasts for about 6 to about 12 hours.

17. The method of claim 1, wherein the wet conching step lasts for at least 1 hour.

18. The method of claim 17, wherein the wet conching step lasts for at least 3 hours.

19. The method of claim 1, wherein the dry conching step lasts for about 6 hours to about 10 to 12 hours.

20. The method claim 1, wherein the chocolate mass is cooled throughout the dry conching step to maintain the dry conching temperature.

21. The method of claim 1, wherein the chocolate mass is heated throughout the wet conching step to maintain the wet conching temperature.

22. The method of claim 1, wherein the chocolate is prepared from a mixture of cocoa products and sugar.

23. The method of claim 1, wherein cocoa butter is added after the dry conching step, and before starting the wet conching step.

24. The method of claim 23, wherein lecithin is added in combination with the cocoa butter.

25. The method of claim 1, further comprising adding lecithin in an amount between 0.1 w/w % and 1 w/w %, wherein the weight percentage is on the total chocolate mass.

26. The method of claim 25, wherein lecithin is added in an amount between 0.4 w/w % and 0.6% w/w %, wherein the weight percentage is on the total chocolate mass.

27. The method of claim 1, wherein the viscosity of the chocolate is adjusted by adding fat and/or cocoa mass after conching.

28. The method of claim 27, wherein the cocoa mass that is added has undergone a heating step for a prolonged time at an elevated temperature.

29. The method of claim 28, wherein the cocoa mass has undergone a heating step for about 12 hours at about 90° C.

30. The method of claim 28, wherein lecithin is added in an amount of about 0.5 w/w %, wherein the weight percentage is on the total chocolate mass.

31. A method for conching chocolate, comprising submitting a chocolate mass to the conching process of claim 1.

32. The method of claim 31, wherein the chocolate mass is cooled throughout the dry conching step to maintain the dry conching temperature.

33. The method of claim 31, wherein the chocolate mass is heated throughout the wet conching step to maintain the wet conching temperature.

34. The method of claim 31, wherein the wet conching step lasts for at least 1 hour.

35. The method of claim 31, wherein the wet conching step lasts for about 6 hours.

36. A method for producing a chocolate, comprising submitting a chocolate mass to the conching step of claim 1 during the production process thereof.

37. The method of claim 1, wherein the dry conching step is performed at a temperature between about 55° C. and about 65° C., and the wet conching step is performed at 90° C.

38. The method of claim 1, wherein the dry conching step lasts for at least 5 hours.

39. The method of claim 1, wherein the dry conching step lasts for at least 6 hours.

* * * * *